United States Patent [19]
Sumi

[11] Patent Number: 6,054,776
[45] Date of Patent: Apr. 25, 2000

[54] CONTROL APPARATUS OF PARALLEL HYBRID ELECTRIC VEHICLE

[75] Inventor: Yasuo Sumi, Fuji, Japan

[73] Assignee: Jatco Corporation, Fuji, Japan

[21] Appl. No.: 09/060,977

[22] Filed: Apr. 16, 1998

[30] Foreign Application Priority Data

Apr. 25, 1997 [JP] Japan .................................. 9-109211

[51] Int. Cl.[7] .............................. B60L 11/12; B61C 9/38
[52] U.S. Cl. ........................ 290/17; 290/30 R; 290/31; 290/36 R; 290/38 R; 290/40 R; 290/41; 290/40 A; 290/40 B; 290/40 C
[58] Field of Search ......................... 290/4 C, 32, 40 C, 290/4 J; 180/65.2, 65.3, 65.4; 322/11, 13, 40

[56] References Cited

U.S. PATENT DOCUMENTS

| | | | |
|---|---|---|---|
| 5,285,111 | 2/1994 | Sherman | 290/4 |
| 5,343,970 | 9/1994 | Severensky | 180/65.2 |
| 5,562,565 | 10/1996 | Moroto et al. | 477/3 |
| 5,637,987 | 6/1997 | Fattic et al. | 322/40 |
| 5,713,425 | 2/1998 | Buschhaus et al. | 180/65.2 |
| 5,789,881 | 8/1998 | Egami et al. | 318/139 |
| 5,847,469 | 12/1998 | Tabata et al. | 290/40 |
| 5,856,709 | 1/1999 | Ibaraki et al. | 290/45 |
| 5,865,263 | 2/1999 | Yamaguchi et al. | 180/65.2 |

FOREIGN PATENT DOCUMENTS 8-135762  5/1996  Japan ..................................... 290/4 J

*Primary Examiner*—Elvin Enad
*Attorney, Agent, or Firm*—Foley & Lardner

[57] ABSTRACT

A parallel hybrid electric vehicle includes an engine and a motor/generator as a rotary driving source. A differential device has a first shaft connected to the engine, a second shaft connected to the motor/generator, and a third shaft connected to a transmission device. The first and the second shafts can be coupled by a direct clutch. At the time of start of the vehicle with the engine in an idling condition, the motor/generator is controlled to enter a reverse rotation power generating condition, and the engine speed is maintained near an idling speed. After the start of the vehicle, when the motor/generator is in a forward rotation condition, the motor/generator is controlled to operate as a motor to maintain the engine speed at a target speed, and when the engine speed and the motor/generator speed coincide with each other, the direct clutch is made to enter a coupled condition thereby to prevent the occurrence of coupling shock, and also to reduce a driving time of the motor/generator.

9 Claims, 21 Drawing Sheets

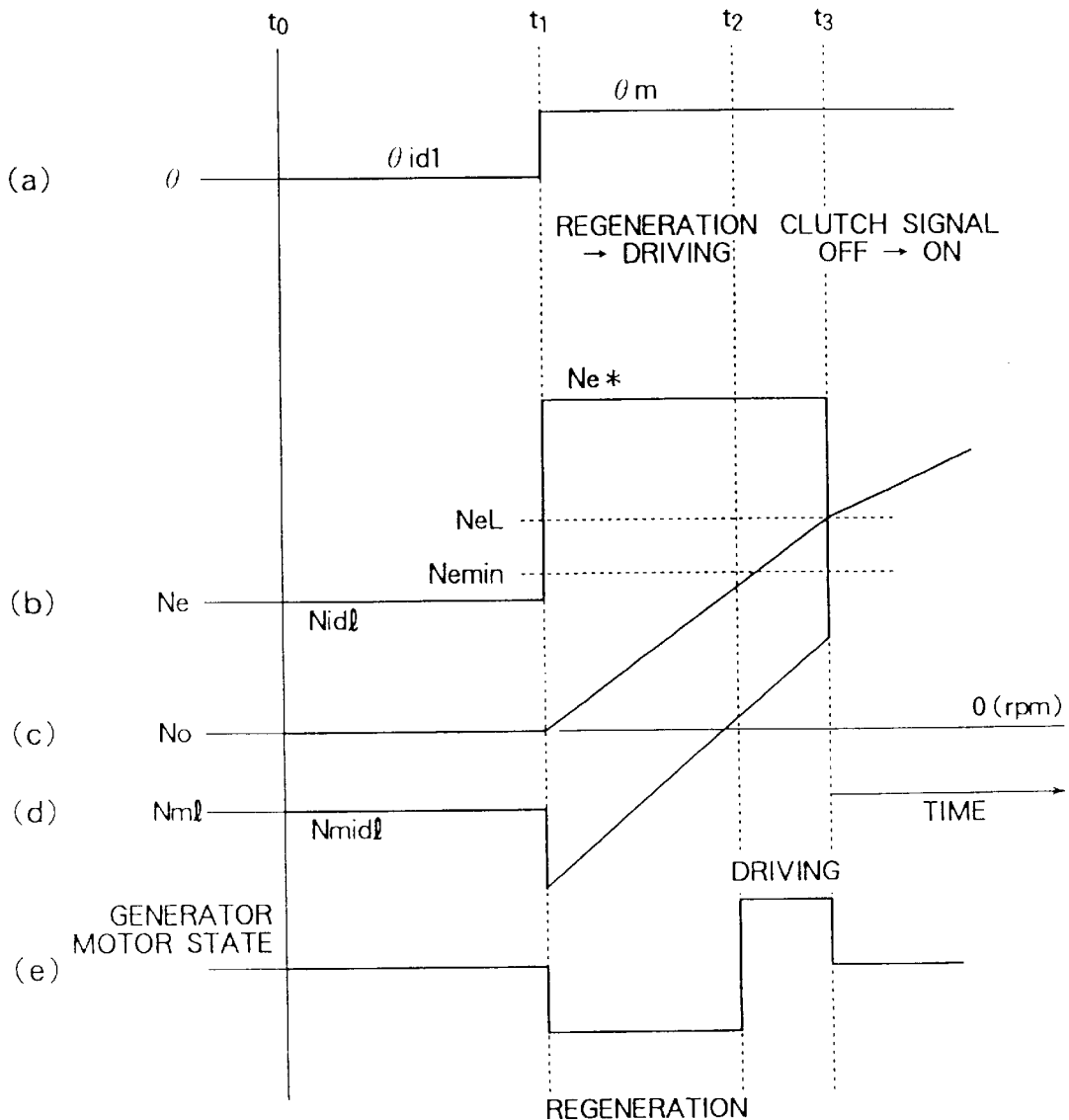

CONTROL APPARATUS OF PARALLEL HYBRID ELECTRIC VEHICLE

BACKGROUND OF THE INVENTION

1. Field of the Invention

The present invention relates to a control apparatus of a parallel hybrid electric vehicle in which an engine, and a motor serving also as a generator are provided and output torques of the engine and the motor are transmitted to a transmission device through a differential device to produce a running driving force from one or both of the engine and the motor.

2. Description of the Prior Art

A prior art control apparatus of a parallel hybrid electric vehicle is described, for example in Japanese Patent Laid Open Publication Hei No. 8-135762.

In this prior art, a starting apparatus is described in which, for example, an output shaft of an engine is connected to a sun gear of a planetary gear mechanism which constitutes a reduction device, an output shaft of a motor which also serves as a generator is connected to a ring gear, and further a direct coupling clutch as a coupling device is interposed between the sun gear and a ring gear thereby to form a parallel hybrid electric vehicle so that a predetermined starting torque is obtained by adding a braking force by the motor to the ring gear at the time of starting the vehicle.

Here, in a control mode at the time of starting in the prior art, as shown in FIG. 29, at a time point t0, the vehicle is stopped and a D range is selected by a selecting lever, and at the same time, the degree of opening of a throttle is at an idling throttle opening degree θidl as shown at (a) in FIG. 29. As result, an engine speed Ne maintains an idling speed Nidl, and further the motor maintains an idling condition as shown at (e) in FIG. 29.

From this condition, when an accel pedal is depressed at a time point t1, a forward clutch of the transmission device is engaged, so that the transmission device enters a forward power transmitting condition, however, since the inertia of the vehicle is transmitted to an output shaft of the transmission device, the rotational speed No of the output shaft is maintained at zero as shown at (c) in FIG. 29

At this time, the motor is rotated in a negative direction, and as shown at (e) in FIG. 29, enters a regenerating condition while generating a braking torque Te1.

On the other hand, the engine speed Ne is set to a target engine speed Ne* by making reference to a target engine speed map on the basis of a throttle opening degree θm at that time so that the target engine speed Ne* becomes constant at a predetermined throttle opening degree or more which is approximated to a stall rotational speed of a torque converter, and as shown at (b) in FIG. 29, the engine speed Ne is controlled to correspond to the target engine speed Ne*.

At this time, the regenerating condition in which the motor as operated as a generator is continued, and the braking torque is generated, and this braking torque is feedback controlled so that the engine speed Ne is maintained at the target engine speed Ne*.

By this feedback control, the output torque is transmitted to the transmission device from a pinion carrier, and the output speed No is gradually increased as shown at (c) in FIG. 29 and the vehicle is started.

Thereafter, at a time point t2, when the rotational speed Nm1 of the motor becomes "0", the motor transits from the regeneration condition to the driving condition as shown at (e) in FIG. 29, and thereafter the motor rotational speed Nm1 is increased while maintaining the engine speed Ne at the target engine speed Ne*, and accordingly the output shaft rotational speed No is also increased.

Then, at a time point t3 when the output shaft rotational speed No reaches an engagement setting value NeL or higher, a clutch signal is outputted and the direct coupling clutch enters a coupling condition. At the same time, the motor enters a non-driving condition and enters an idling condition, and the rotation of the engine output shaft is transmitted to the output shaft as it is.

However, in the prior art control apparatus of parallel hybrid electric vehicle, at the same time that the throttle opening degree is depressed, the target engine speed Ne* is set reference on the throttle opening degree by making reference to a preset target engine speed map, and the engine speed Ne is made to be increased so as to be maintained at the target engine speed Ne*. Consequently, a difference between the rotational speeds of the motor and the engine becomes extremely large, and at the time of coupling the direct coupling clutch upon the output shaft rotational speed No reaches the engagement setting value NeL, the direct coupling clutch is coupled with the large rotational speed difference remained between the engine speed Ne and the motor speed Nm1, and thus, there is an unsolved problem that a large coupling shock occurs.

Furthermore, in order to prevent the coupling shock, when the coupling of the direct coupling clutch is delayed until a speed difference between the engine speed Ne and the motor speed Nm1 becomes zero, another unsolved problem arises that the driving time of the motor becomes long and the necessity of using a motor having a large rating capacity occurs.

Moreover, since there is a need to change both the engine speed and the motor speed at the initial stage of the start of the vehicle, another unsolved problem arises that most of the torque generated by the engine and the motor will be consumed to accelerate the engine and the motor, and the torque to accelerate the vehicle is reduced and the accelerating performance of the vehicle just after the start will be degraded.

SUMMARY OF THE INVENTION

The present invention was made in view of the unsolved problems in the prior art, and it is an object to provide a control apparatus of a parallel hybrid electric vehicle which generates no coupling shock at the time of coupling of the coupling device at the time of starting the vehicle, and at the same time, which reduces as far as possible the time until the coupling of the coupling device is completed from the start of the vehicle to enable to achieve a small capacity of rated capability of the motor, and which further improve the accelerating performance just after the start of the vehicle.

In order to achieve the above-mentioned object, in a first aspect of the invention, a control apparatus of a parallel hybrid electric vehicle comprising an engine, an electric rotary driving source having both functions of a generator and a motor, a transmission device, a differential device having a first shaft connected to the engine, a second shaft connected to an output shaft of the electric rotary driving source, and a third shaft connected to the transmission device, and a coupling device for connecting and disconnecting between two shafts selected from the first, second, and third shafts, wherein the coupling device is made to enter a non-coupled condition at the time of start or the vehicle so that the torque of the electric rotary driving source is controlled to maintain the engine speed at a predetermined idling speed during the starting, and the coupling device is controlled to enter the coupling condition when rotational speeds of the first, second, and third shafts of the differential device are in coincidence with one another.

In the first aspect of the invention, at the time of starting the vehicle, the electric rotary driving source is operated as the generator to produce a braking torque so that the engine speed is maintained at a predetermined idling speed thereby to suppress a speed difference between the engine speed and the electric rotary driving source to a small value. In addition, since the coupling device is made to enter the coupled condition when the rotational speeds of the first shaft in the differential device connected to the engine rotary shaft, the second shaft connected to the rotary shaft of the electrical rotary driving source, and the third shaft which is the output shaft of the transmission device are in coincidence with one another, it is possible to surely prevent the occurrence of the coupling shock, and at the same time, the driving time of the electric rotary driving source can be made short so that the electric rotary driving source can be made small in size. Furthermore, since the engine speed is maintained at a predetermined idling speed, the torque which is consumed to increase the engine speed is suppressed and this suppressed amount of torque can be transmitted to the differential device so that the acceleration performance just after the start of the vehicle can be improved.

In a second aspect of the invention, in a control apparatus of a parallel hybrid electric vehicle comprising an engine, an electric rotary driving source having both functions of a generator and a motor, a transmission device, a differential device having a first shaft connected to the engine, a second shaft connected to an output shaft of the electric rotary driving source, and a third shaft connected to the transmission device, and a coupling device for connecting and disconnecting between two shafts of the first, second, and third shafts, wherein further comprises an engine speed detection means for detecting the engine speed, an electric rotary driving source speed detection means for detecting a rotational speed of the electric rotary driving source, a rotary driving source control means for controlling a torque of the electric rotary driving source, and a coupling control means for controlling a change-over of the coupling device between a non-coupled condition and a coupled condition. The rotary driving source control means sets an idling speed detected by the engine speed detection means at the time of starting of the vehicle to a target speed, and controls the torque of the electric rotary driving source so that the target speed is maintained, and the coupling control means controls the coupling device to enter the non-coupled condition when an engine speed detection value of the engine speed detection means is equal to or lower than a rotary driving source speed detection value of the electric rotary driving source speed detection value, and controls the coupling device to enter the coupled condition when the engine speed detection value exceeds the rotary driving source speed detection value.

Also in the second aspect of the invention, the rotary driving source control means sets the idling speed as a target speed, and controls the torque of the electric rotary driving source so that the target speed is maintained, and the coupling control means controls the coupling device to enter the coupled condition when the engine speed exceeds the electric rotary driving source speeds so that a similar effect to that of the first aspect of the invention can be obtained.

Furthermore, in a third aspect of the invention, in the second aspect of the invention, the rotary driving source control means makes the electric rotary driving source operate as a generator to reduce the speed to apply a braking torque to the engine when the engine speed detection value of the engine speed detection means exceeds the target speed and when the electric rotary driving source is in a reverse rotating condition. Whereas when the engine speed detection means exceeds the target speed and when the electric rotary driving source is in a forward rotating condition, the electric rotary driving source is operated as the motor to increase the speed thereby to apply a braking torque to the engine.

In the third aspect of the invention, depending on the rotating condition of the electric rotary driving source, the braking torque generated when the electric rotary driving source is operating as the generator and the braking torque generated when the electric rotary driving source is operating as the motor can be changed over to add the rotational speed of the electric rotary driving source to the engine speed to increase the engine speed. Thus, the driving time of the electric rotary driving source can be reduced.

Furthermore, in a fourth aspect of the invention, in the second and third aspects of the invention, during stopping of the vehicle, when the transmission device is being set to a non-driving range, the rotary driving source control means controls the electric rotary driving source to enter a forward power generating condition, and during the stopping of the vehicle, when the transmission device is in a driving range and the engine is at an idling speed, the electric rotary driving source is controlled to enter a reverse power generating condition.

In this fourth aspect of the invention, during the stopping of the vehicle, when the transmission device is in the non-driving range of a parking range or a neutral range, and in the driving range such as a drive range, a reverse range or the like, and when the engine is at the idling speed, the rotary driving source control means controls the electric rotary driving source to operate as the generator. Thus, it is possible to omit an alternator, and to make the vehicle small in size and to reduce weight.

Furthermore, in a fifth aspect of the invention, in any one of the second to fourth aspects of the invention, rotary driving source control means controls the electric rotary driving source to increase the power generating capability as the vehicle speed at the time of braking is increased thereby to increase a regenerative braking force In this fifth aspect of the invention, the energy at the time of deceleration can be regenerated, and it is possible to improve the running fuel consumption of the vehicle by driving an auxiliary machine by the regenerated energy and by storing in an electrical storage device.

Furthermore, in a sixth aspect of the invention, in any one of the first to fifth aspects of the invention, the transmission device is constituted solely by a transmission mechanism which includes no starting mechanism for performing torque control at the time of starting.

In the sixth aspect of the invention, it is possible to omit a starting mechanism such as a torque converter or the like which performs the torque control at the time of starting as in the prior art transmission device. Thus, the transmission device can be made simple, small in size and light in weight.

Furthermore, in a seventh aspect of the invention, in any one of the first to sixth aspects of the invention, an one-way clutch is connected in parallel with the coupling device which enters a coupling condition when the directions of rotation of the two shafts which are to be connected and disconnected are in coincidence with each other and when the speed of the electric rotary driving source is equal to or higher than the engine speed.

In the seventh aspect of the invention, at the time of starting of the vehicle, the one-way clutch enters mechanically a coupled condition when the engine speed reaches an electric rotary driving source speed, and no accurate coupling control of the coupling device is needed. Thus, a minute coupling shock caused by a response delay or the like can be surely prevented, and a simple control is only necessary to couple the coupling device after confirming that the engine speed has reached in coincidence with the electric rotary driving source speed.

Furthermore, in a eighth aspect of the invention, in the seventh aspect of the invention, at the time of starting the engine, the engine is started by the electric rotary driving source through the one-way clutch.

In the eighth aspect of the invention, by starting the engine by the electric rotary driving source, it is possible to omit the starter motor in the prior art, and to make the vehicle small in size and light in weight.

Furthermore, in a ninth aspect of the invention, in any one of the first to eighth aspects of the invention, driving control means is provided for driving and controlling both the engine and the electric rotary driving source on the basis of an accel opening degree and a vehicle speed when a high engine load is needed after the coupling device enters the coupling condition at the time of starting the vehicle.

In the ninth aspect of the invention, when a high engine load is needed for acceleration or the like, by using the electric rotary driving source as a driving force assisting device, the accelerating performance can be improved, and at the same time, the fuel consumption can be improved by using the regenerated energy effectively.

Furthermore, in a tenth aspect of the invention, in any one of the second to ninth aspects of the invention, the rotary driving source control means controls to gradually reduce the driving torque of the electric rotary driving source when the coupling device enters the coupling condition and the driving of the electric rotary driving source is to be stopped.

In the tenth aspect of the invention, since the driving torque of the electric rotary driving source is controlled to gradually reduce just after the coupling device enters the coupled condition, a shock due to rapid reduction of the torque can be prevented, and at the same time, during such a period, since the driving torque of the electric rotary driving source can be used for acceleration, the accelerating performance can be improved by this amount.

BRIEF DESCRIPTION OF THE DRAWINGS

FIG. 29 is a time chart for explaining an operation in the prior art.

DESCRIPTION OF THE PREFERRED EMBODIMENTS

Figure 1:
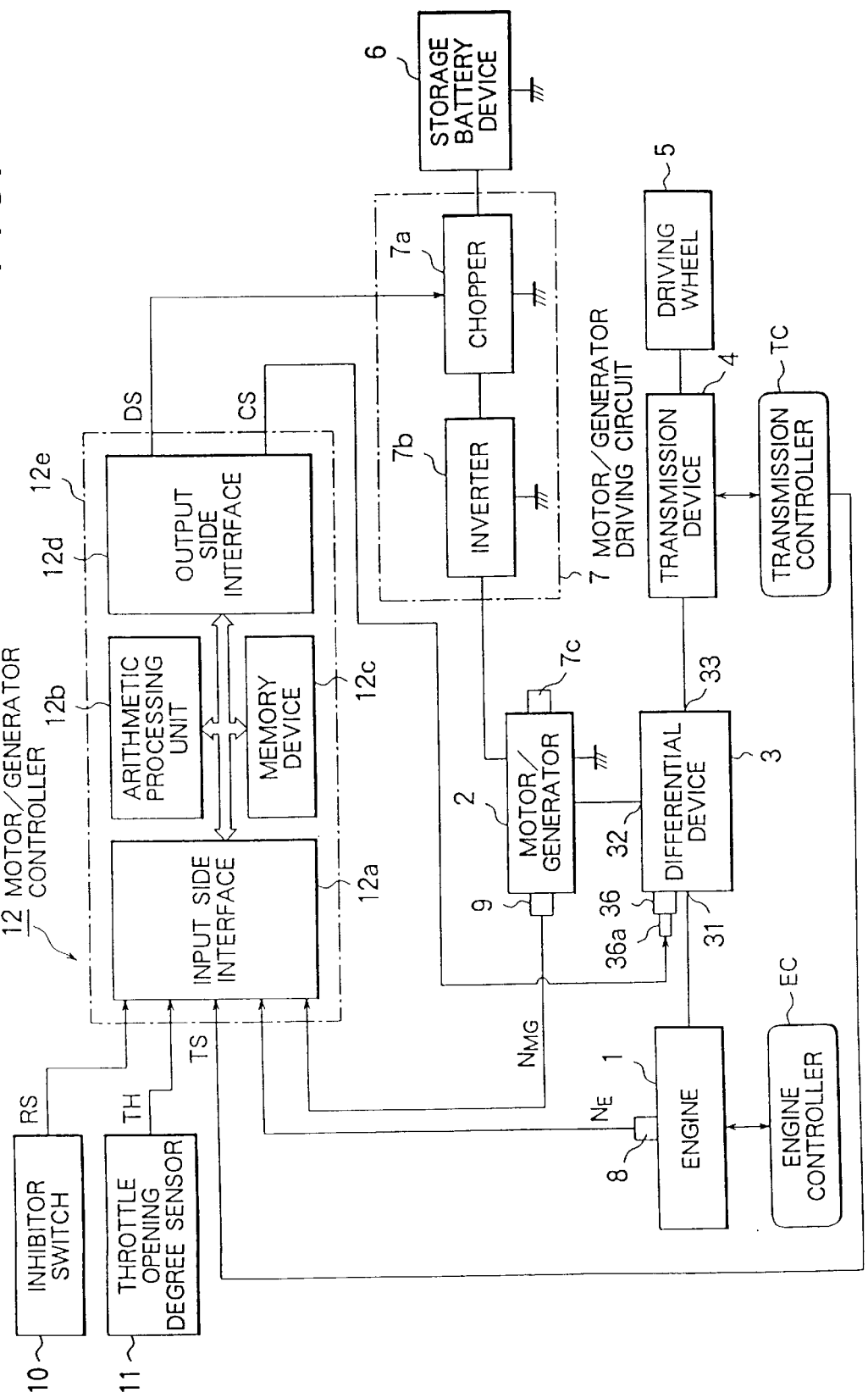
FIG. 1 is a schematic block diagram showing a first embodiment of the invention.

FIG. 1 is a schematic block diagram showing an embodiment of the present invention, and output sides of an engine 1 and an AC type motor/generator 2 constituted by a three-phase induction motor/generator as an electric rotary driving source operating as a generator or a motor are respectively connected to a first shaft 31 and a second shaft 32 at an input side of a differential device 3, and a third shaft 33 at an output side of this differential device 3 is connected to an input side of a transmission device 4 which has no starting device such as a torque converter mounted thereon. An output side of the transmission device 4 is connected to a driving wheel 5 through a final reduction device not shown.

The engine 1 is controlled by an engine controller EC, and the motor/generator 2 includes a stator 2S and a rotor 2R, and controlled by a motor/generator driving circuit 7 connected to a storage battery device 6 constituted by a battery or a capacitor which can be charged.

The motor/generator driving circuit 7 is constituted by a chopper 7a connected to the storage battery device 6, and an inverter 7b connected between the chopper 7a and the motor/generator 2 and including, for example, six thyristors for converting a DC to a three-phase AC. The chopper 7a is supplied with a duty control signal DS from a motor/generator controller 12 described later, and the chopper 7a delivers a chopper signal having a duty ratio corresponding to the duty control signal DS to the inverter 7b. The inverter 7b controls the motor/generator 2 on the basis of a rotary position detecting signal of a position sensor 7c which detects a rotary position of the rotor of the motor/generator 2 in which a gate control signal of each thyristor of the inverter 7b is formed so that the inverter 7b produces the three-phase AC for driving the motor/generator 2 at a frequency synchronized with the rotation such that the motor/generator 2 is operated as a motor during forward rotation, and operated as a generator during reverse rotation.

Figure 2:
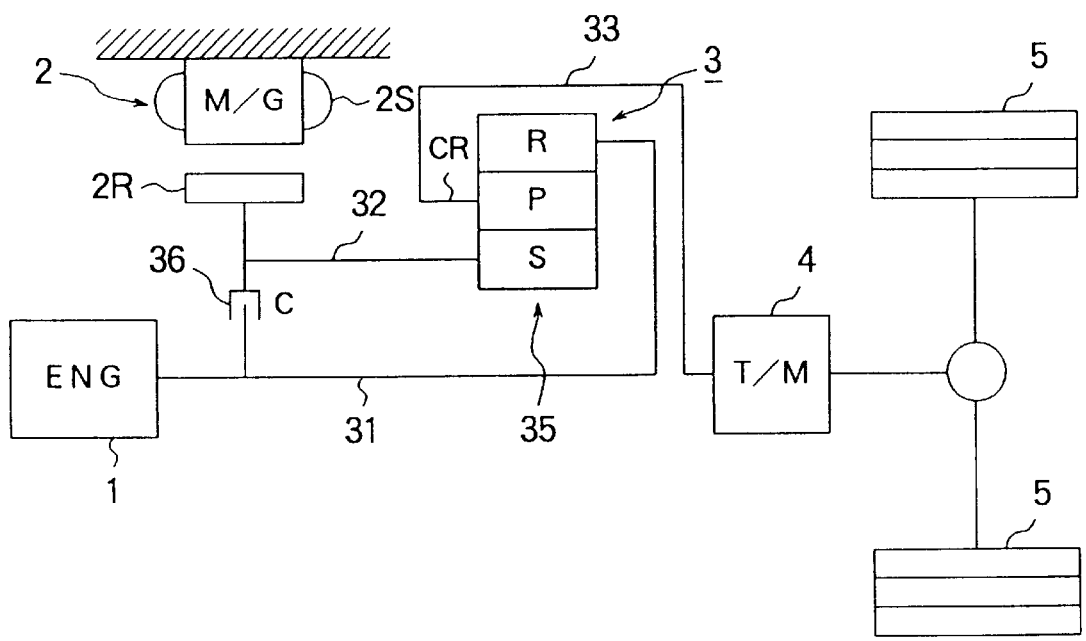
FIG. 2 is a schematic diagram showing an example of a paralell hybrid system which is applicable to the first embodiment of the invention.

The differential device 3 includes, as shown in FIG. 2, a planetary gear mechanism 35 having a sun gear S, a plurality of pinions P engaging the sun gear S at an outer peripheral side at equiangular intervals, a pinion carrier CR supporting each pinion P, and a ring gear R engaging at an outer side of the pinions P. The ring gear R is connected to an output shaft of the engine 1 through the first shaft 31, the sun gear S is connected to an output shaft connected to the rotor 2R of the motor/generator 2 through the second shaft 32 and the pinion carrier CR is connected to an input side of the transmission device 4 through the third shaft 33, and a direct coupling clutch 36 is interposed between the first shaft 31 and the second shaft 32 as a coupling device which controls the coupling condition therebetween.

The direct coupling clutch 36, for example, is formed by a wet type multiplate clutch, and when the control signal CS supplied to an electromagnetic solenoid 36a (shown in FIG. 1) of an solenoid valve (not shown) which feeds and discharges a line pressure to a cylinder portion is at a low level, the direct coupling clutch 36 is controlled to enter a non-coupled condition in which the first shaft 31 and the second shaft 32 are disconnected, and when the control signal CS is at a high level, it is controlled to enter a coupled condition in which the first shaft 31 and the second shaft 32 are connected.

Furthermore, the transmission device 4 is controlled by a transmission device controller TC to obtain a transmission gear ratio from a first speed to a fourth speed which is determined by making reference to a transmission control map preset on the basis of a vehicle speed and a throttle opening degree.

The engine 1 and the motor/generator 2 are respectively provided with an engine speed sensor 8 and a motor/generator speed sensor 9 for detecting rotational speeds of the output shafts. There are further provided with an inhibitor switch 10 for outputting a range signal corresponding to a range selected by a selecting lever, and a throttle opening degree sensor 11 for detecting a throttle opening degree corresponding to an amount of depression of an accel pedal. Speed detection values $N_E$ and $N_{MG}$ of the speed sensors 8 and 9, and a range signal RS of the inhibitor switch 10 and a throttle opening degree value TH of the throttle opening degree sensor 11 are supplied to a motor/generator controller 12 for controlling the motor/generator 2 and the direct coupling clutch 36.

The motor/generator controller 12 is constituted by a microcomputer 12e including at least an input side interface circuit 12a, an arithmetic processing unit 12b, a memory device 12c and an output side interface circuit 12d.

The input side interface circuit 12a is supplied with the engine speed detection value $N_E$ of the engine speed sensor 8, motor/generator speed detection value $N_{MG}$ of the motor/generator speed sensor 9, range signal RS of the inhibitor switch 10 and throttle opening degree value TH of the throttle opening degree sensor 11.

The arithmetic processing unit 12b enters an operating condition when, for example, a key switch (not shown) is turned on and a predetermined power supply is turned on, and first, it is initialized, and turns oft a driving duty control signal MS and a power generation duty control signal GS, and at the same time, also turns oft a clutch control signal CS. Thereafter, at lest at the time of starting of the vehicle, an arithmetic processing of FIG. 3 described later is executed on the bases of the engine speed detection value $N_E$, motor/generator speed detection value $N_{MG}$, range signal RS, and throttle opening degree value TH, and the motor/generator 2 and the direct coupling clutch 36 are controlled.

The memory device 12c stores beforehand a processing program required for the arithmetic processing by the arithmetic processing unit 12b, and at the same time, stores various data required in the arithmetic process by the arithmetic processing unit 12b.

The output side interface circuit 12d supplies the driving duty control signal MS and power generation duty control signal GS and clutch control signal CS which are the result of the operation to the motor/generator driving circuit 7 and the electromagnetic solenoid 36a.

Next, the operation in the first embodiment will be described with reference to a flow chart which shows an example of a control processing executed by the arithmetic processing unit 12b in the microcomputer 12e.

In the arithmetic processing unit 12b, after finishing the initialization processing mentioned above, a start control processing of FIG. 4 is executed.

In this vehicle start control processing, first, in step S1, a range signal RS of the inhibitor switch 10 is read, and then proceeds to step S2 where it is decided whether or not the range signal RS is in a drive range D. It is in a parking range P or a neutral range N other than the drive range D, returns to the step S1, and when the drive range D is selected, proceeds to step S3.

In this step S3, an engine speed detection value NE of the engine speed sensor 8 is read, and proceeds to step S4, an the read engine speed detection value $N_E$ is set as an engine target speed $N_{ET}$, and this is stored as an update value in a target speed storage region in the memory device 12c.

Then proceeds to step S5, and a throttle opening degree detection value TH of the throttle opening degree sensor 11 is read. Then proceeds to step S6, and it is decided whether or not the throttle opening degree detection value TH exceeds "0". This decision is made to determine whether an accel pedal is being depressed or not, and it TH=0, it is judged that the accel pedal is not depressed and that it is not in a starting condition, and returns to step S3. if TH>0, it is judged that the accel pedal has been depressed and that it is in the starting condition, and proceeds to step S7.

In this step S7, a current engine speed detection value $N_E$ is read, and then proceeds to step S8, and it is decided whether or not the read engine speed detection value NE coincides with the engine target speed $N_{ET}$ which has been set in step S4. It $N_E=N_{ET}$, proceeds to step S12 as it is, and it $N_E$ is not $N_{ET}$, proceeds to step S9, and it is decided whether or not the engine speed detection value $N_E$ exceeds the engine target speed $N_{ET}$. It $N_E>N_{ET}$, proceeds to step S10, and performs a braking torque increasing control to increase a braking torque of the motor/generator 2, and then proceeds to step S12. However it $N_E<N_{ET}$ in step S9, proceeds to step S11, and performs a braking torque reducing control to reduce a braking torque of the motor/generator 2, and then proceeds to step S12.

Here, the braking torque increasing control of the motor/generator 2 in step S10 is performed when the motor/generator 2 is operating as a generator, to increase the braking torque by increasing a counter electromotive force which is generated, by increasing a duty ratio of the duty control signal DS supplied to the chopper 7a of the motor/generator driving circuit 7. Conversely, when the motor/generator 2 is operating as a motor, the braking torque is increased by reducing the driving torque by reducing the duty ratio of the duty control signal DS.

Furthermore, the braking torque reducing control of the motor/generator 2 in step S11 is performed in an opposite way to that mentioned above. That is when the motor/generator 2 is operating as the generator, the braking torque is reduced by reducing the counter electromotive force which is generated, by reducing the duty ratio of the duty control signal DS, whereas when the motor/generator 2 is operating as the motor, the braking torque is reduced by increasing the driving torque by increasing the duty ratio of the duty control signal DS.

In step S12, a motor/generator speed detection value $N_{MG}$ of the motor/generator speed sensor 9 is read, and then proceeds to step S13, and it is decided whether or not the engine speed detection value $N_E$ is exceeding the motor/generator speed detection value $N_{MG}$. If $N_E > N_{MG}$, returns to the step S7, and it $N_E < N_{MG}$, it is judged that the speed of the motor/generator 2 has exceeded the engine speed, and proceeds to step S14.

In step S14, a clutch control signal CS at a high level is delivered to the electromagnetic solenoid 36a to make the direct coupling clutch 36 enter the coupling condition, and then proceeds to step S15, and performs a torque reducing control processing to gradually reduce the driving torque of the motor/generator 2. In this torque reducing control processing, the chopper 7a of the motor/generator driving circuit 7 is supplied with a duty control signal DS of a new value obtained by reducing a predetermined duty ratio reduction quantity from the duty ratio of the current duty control signal DS.

Then proceeds to step S16, and it is decided whether or not the duty ratio of the driving duty control signal MS has reached "0", and when the duty ration has not yet reached "0", proceeds to step S17, and waits until a predetermined time elapses. When the predetermined time elapses, returns to step S15, and when the duty ratio reaches "0", the start control processing is finished as it is, and returns to a predetermined main program.

Figure 4:
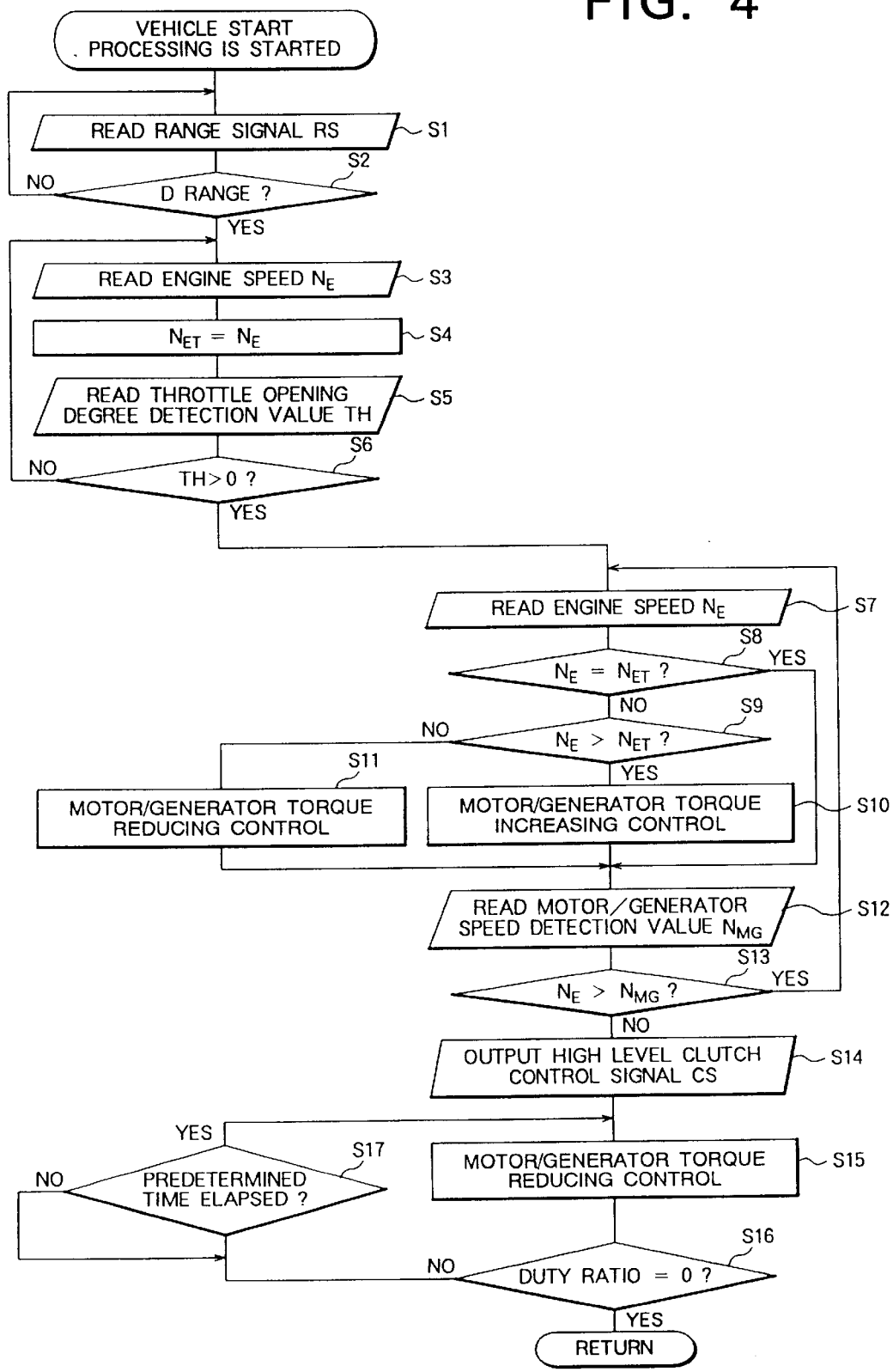
FIG. 4 is a flow chart of an example of a vehicle start control processing of a motor/generator controller in the first embodiment of the invention.

In the processing of FIG. 4, the processing from step S1 to step S11 corresponds to the rotary driving source control means, and the processing from step S12 to step S17 corresponds to the coupling control means.

Here, it is supposed that the vehicle is stopping on a flat and not-inclined road, and the engine 1 is idling with its idling speed of $N_{IDL}$, and further, it is supposed that, for example, a neutral range N is selected by a selecting lever.

In this stopping condition, because of the initializing processing performed at the time when the key switch is turned on, the driving duty control signal MS, the power generation duty control signal GS and the clutch control signal CS have been controlled to be in an OFF condition.

Thus, the motor/generator 2 is in a non-controlled condition and in an idling condition driven into a forward direction, and the input side of the transmission 4 is also in an idling condition, and further, the engine 1 is controlled by the engine controller EC to be at an idling speed $N_{IDL}$.

At this time, the start control processing of FIG. 4 is being executed by the arithmetic processing unit 12b of the motor/generator controller 12, however, since the neutral range N has been selected by the selecting lever, it is in a waiting condition until a drive range D is selected in step S2.

Figure 5:
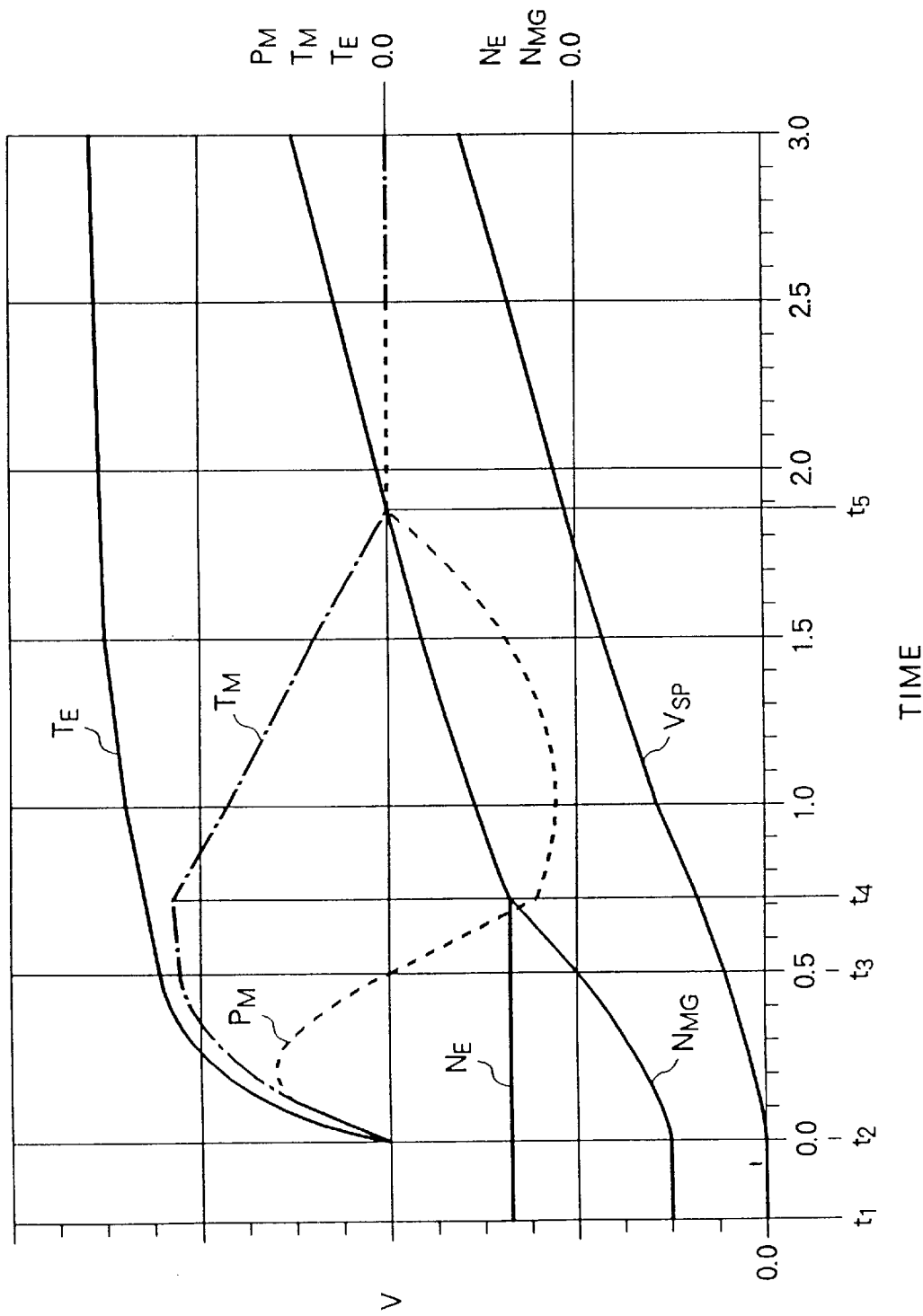
FIG. 5 is a time chart showing a simulation result at a time of rapid start of the vehicle on a flat road.

Thereafter, as shown in time chart of FIG. 5 by simulation, when the drive range D is selected at a time point t1 by the selecting lever while holding a braking condition by depressing a braking pedal, since both the vehicle speed detection value $V_{SP}$ and the throttle opening degree detection value TH are at "0", the transmission device 4 is controlled at a transmission ratio of the first speed by the transmission controller TC.

At this time, since the vehicle is stopping due to its inertia, the rotational speed of the pinion carrier CR of the differential device 3 connected to the input shaft of the transmission device 4 is zero. For this reason, since the engine speed $N_E$ maintains its idling speed $N_{IDL}$, the rotational speed of the sun gear S, that is, the speed $N_{MG}$ of the motor/generator 2 is in a reverse rotation condition as shown by a characteristic line L1 in a lever diagram shown in FIG. 3.

Figure 3:
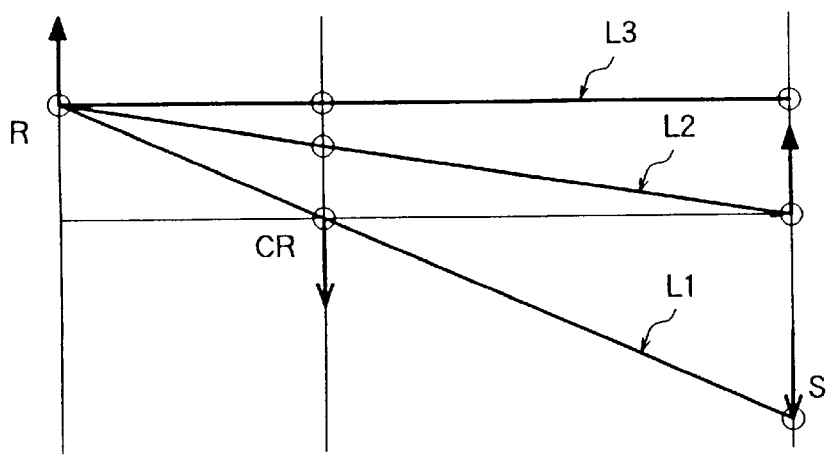
FIG. 3 is a lever diagram of the differential device in FIG. 2.

Here in FIG. 3, the upward arrow shows driving, and the downward arrow shows being-driven, and at this time point t1, the vehicle is in a braking condition and since the accel pedal is not depressed, in the vehicle start control processing of FIG. 4, the processing in step S2 and step S3 to step S6 is repeated. That is, the engine speed $N_E$ at that time point is set as the engine target speed $N_{ET}$, and this is merely updated and stored in a predetermined storage region of the memory device 12c, and since the processing in step S7 and subsequent thereto is not performed, the motor/generator 2 continues its idling condition.

Thereafter, at a time point t2, when the brake pedal is released, and instead of this, the accel pedal is fully depressed, and a rapid start manipulation is performed with the throttle opening degree detection value TH at its fully opened condition, an engine torque $T_E$ corresponding to the fully depressed amount of the accel pedal is generated by the engine controller EC, and this engine torque $T_E$ increases rapidly as shown in FIG. 5.

On the other hand, in the vehicle start control processing of FIG. 4, the throttle opening degree detection value TH is increased due to the depression of the accel pedal, and proceeds to step S7 from step S6, and the engine speed $N_E$ at that time is read, and it is decided whether or not this engine speed $N_E$ coincides with the engine target speed $N_{ET}$ (step S8).

At this time, the engine speed detection value $N_E$ is also increased due to the depression of the accel pedal, and when it exceeds the engine target speed $N_{ET}$, proceeds to step S10 through steps S8 and S9, and the motor/generator torque increasing process begins.

Accordingly, for the motor/generator 2, a duty control signal DS of a duty ratio added with a duty ratio correction value corresponding to a deviation between the engine speed detection value $N_E$ and the engine target speed $N_{ET}$ is delivered to the chopper 7a of the motor/generator driving circuit 7, and the feedback control is performed and the motor/generator 2 is operated as the generator. Since the output $P_M$ of the motor/generator 2 is rapidly increased as shown by a broken line in FIG. 5, a braking torque is generated, and since this is transmitted to the sun gear S of the differential device 3, the braking torque is transmitted to the ring gear R through the pinion P, the engine speed detection value $N_E$ is reduced and coincides with the engine target speed $N_{ET}$.

At this time, when the engine speed detection value $N_E$ is smaller than the engine target speed $N_{ET}$, proceeds to step S11, and the torque reducing processing of the motor/generator 2 is carried out.

Accordingly, for the motor/generator 2, a duty control signal DS of a duty ratio reduced by a duty ratio correction value corresponding to a deviation between the engine speed detection value $N_E$ and the engine target speed $N_{ET}$ is delivered to the chopper 7a of the motor/generator driving circuit 7 operating as the generator, and the feedback control is performed. Since the braking torque of the motor/generator 2 is reduced and this is transmitted to the sun gear S of the differential device 3, this braking torque as transmitted to the ring gear R through the pinion P, and the engine speed detection value $N_E$ is increased and coincides with the engine target speed $N_{ET}$.

In this manner, the braking torque of the motor/generator 2 is controlled so that the engine speed detection value $N_E$ coincides with the engine target speed $N_{ET}$, and the output torque $T_M$ of the motor/generator 2 is increased in correspondence with an increase of the engine torque $T_E$ as shown by a long and short dash line in FIG. 5.

With the generation of the braking torque in the motor/generator 2, a torque represented by the sum of the engine torque $T_E$ and the braking torque $T_M$ is transmitted to the driving wheel 5 through the transmission device 4, and the vehicle starts its acceleration, and the vehicle speed detection value $V_{SP}$ is increased as shown in FIG. 5.

As the vehicle is accelerated, the rotational speed of the sun gear S, that is, a reverse rotational speed $N_{MG}$ of the motor/generator 2 is gradually reduced as shown in FIG. 5, and with this decrease, the output of the motor/generator 2 begins decreasing over its peak, and when the speed detection value $N_{MG}$ of the motor/generator 2 and the output $P_{MG}$ become "0" at a time poing t3, the rotational speed of the sun gear S is represented by a characteristic line L2 of the lever diagram of FIG. 3.

After this time point t3, since a driving duty control signal MS is delivered to the motor/generator driving circuit 7 from the motor/generator controller 12, the motor/generator 2 operates as the motor, and the braking torque is changed to the driving torque, and the output $P_M$ is increased in the driving direction so that the motor/generator speed detection value $N_{MG}$ is increased towards the engine speed detection value $N_E$ as shown in FIG. 5.

Then when the motor/generator 2 is further accelerated in a forward rotational direction, since the engine speed detection value $N_E$ is maintained at the idling speed $N_{IDL}$, the rotational speed of the sun gear S, that is, the speed of the motor/generator 2 is increased, and at a time point t4, the motor/generator speed detection value $N_{MG}$ coincides with the engine speed detection value $N_E$. The rotational speed of the sun gear S at this time is represented by a characteristic line L3 in the lever diagram of FIG. 3.

In this manner, when the motor/generator speed detection value $N_{MG}$ coincides with the engine speed detection value $N_E$, in the vehicle start control processing of FIG. 4, proceeds to step S14 from step S13, and since the clutch control signal CS at a high level is delivered to the electromagnetic solenoid 36a of the direct coupling clutch 36, the direct coupling clutch 36 enters a coupling condition from a non-coupling condition, and the ring gear R and the sun gear S are directly coupled.

Then proceeds to step S15, and a motor/generator reducing control processing is executed to reduce the driving torque of the motor/generator 2. Since the duty ratio of the duty control signal DS is reduced by a predetermined reduction amount, the driving torque $T_M$ of the motor/generator 2 is gradually reduced as shown in FIG. 5, and thereafter, the output $P_M$ of the motor/generator 2 also begins reducing over its peak, and at a time point t5, the duty ratio of the driving duty control signal MS becomes "0"% so that the driving of the motor/generator 2 is stopped and transits to an idling condition. Thereafter, the vehicle continues its acceleration only by the driving torque from the engine 1.

In this case, when the vehicle is to be stopped by bringing it into a decelerating condition, contrary to the case of the starting, when the engine speed detection value $N_E$ reaches the idling speed $N_{IDL}$ or lower, the clutch control signal CS is changed from a high level to a low level so that the direct coupling clutch 36 enters the non-coupling condition thereby to prevent the engine stall.

Figure 6:
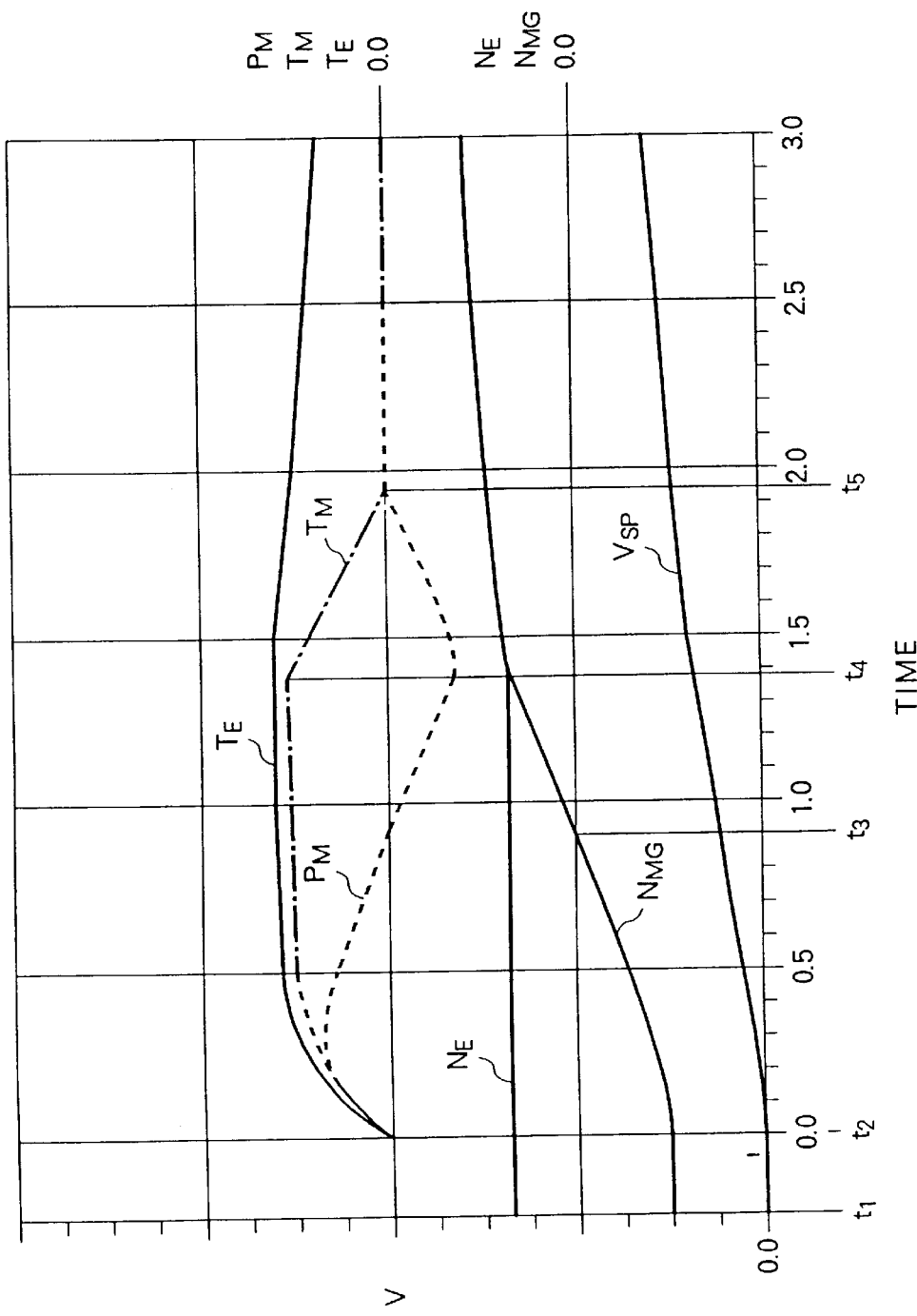
FIG. 6 is a time chart showing a simulation result at a time of slow start of the vehicle on a flat road.

On the other hand, on a flat and not-inclined road, when slow start of the vehicle is performed in place of rapid start with a throttle opening degree detection value TH of, for example, $\frac{1}{16}$ opening degree, as shown in FIG. 6, as the vehicle start control processing, a processing similar to the case of FIG. 5 is performed. However, since the engine torque $T_E$ is small as compared with that in the rapid start, the acceleration of the vehicle takes place gradually, and since the driving torque is small during the substantial driving time, that is, during the time period between time points t2 and t4, the driving time becomes longer than about 0.7 seconds required for the rapid start on the flat ground in FIG. 5 mentioned above, however, irrespective of this, the driving time is relatively short such as about 1.4 seconds.

Figure 7:
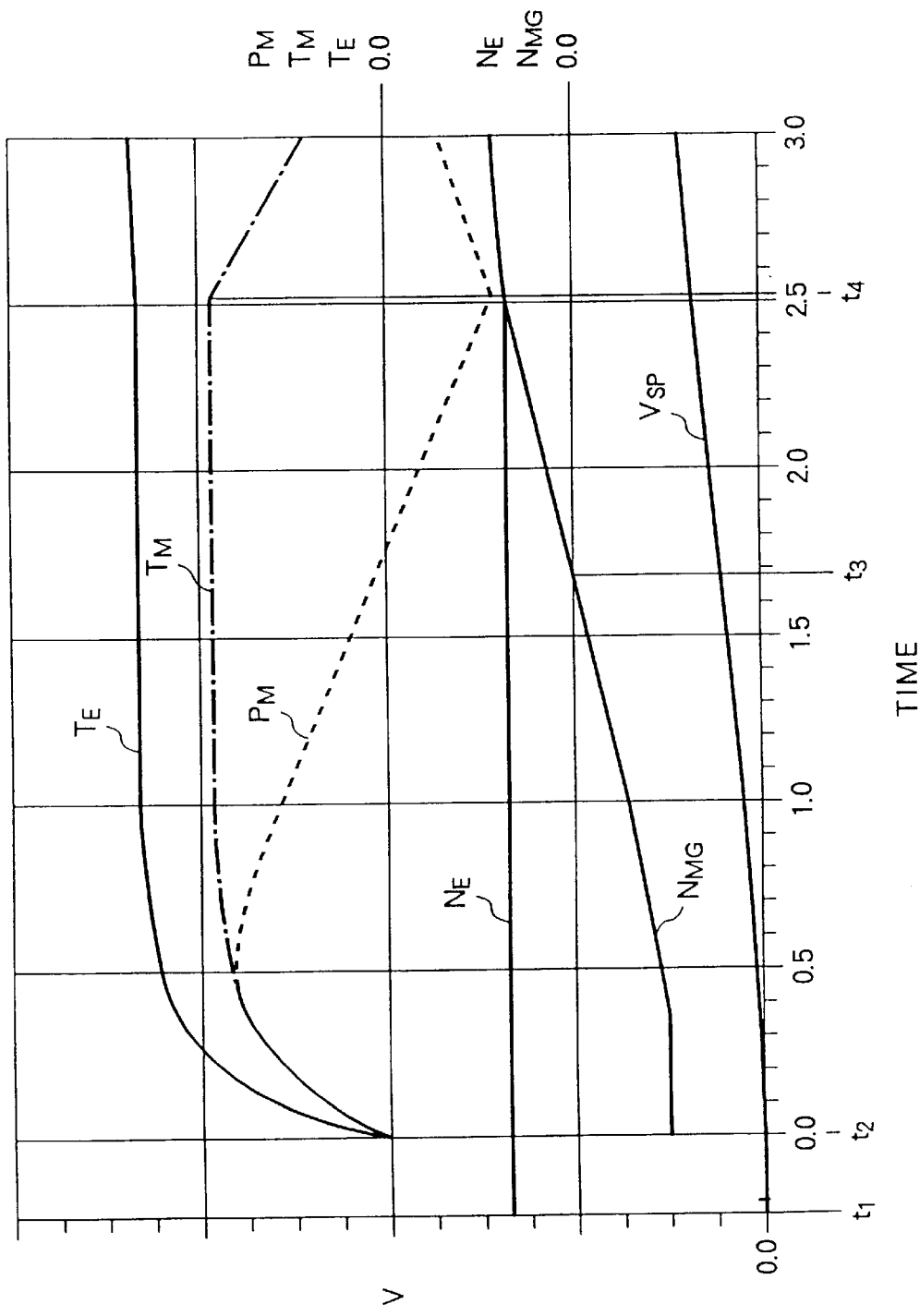
FIG. 7 is a time chart showing a simulation result at a time of rapid start of the vehicle on an ascent.

Furthermore, when the vehicle is rapidly started on a road of upward gradient of 30%, as shown in FIG. 7, as the start control processing, the processing similar to the case of FIG. 5 is performed. However, since the road has upward gradient, the load is large and the acceleration is performed gradually. As a result, the substantial driving time of the motor/generator 2 is about 2.5 seconds which is longer than the slow start in FIG. 6.

As described above, in the first embodiment, the braking torque of the motor/generator 2 is controlled so that the engine speed $N_E$ at the time of start coincides with the engine target speed $N_{ET}$ which is the engine speed just before the start. For this reason, a speed difference between the engine speed $N_E$ and the speed $N_{MG}$ of the motor/generator is small, and it is possible to make the engine speed $N_E$ coincide with the speed $N_{MG}$ of the motor/generator 2 in a short time. Since the direct coupling clutch 36 constituting the coupling device is changed over from the non-coupling condition to the coupling condition when both the speeds coincide with each other, the occurrence of the coupling shock can be surely prevented, and it is possible to avoid the feeling of abrupt change by the driver.

Consequently, the driving time of the motor/generator 2 is only required to be about 3 seconds or smaller regardless of the throttle opening degree and the gradient, and the motor/generator can be made small in size and light in weight.

Specifically, the rating torque of the motor/generator 2, different from the engine 1 which is an internal combustion engine, is determined in most cases on the basis or the heat resistance property against the heat generation by a coil, and the rating torque such as continuous rating, one hour rating, one minute rating, 20 seconds rating and the like are specified. Among these rating torques, the 20 seconds rating can provide a torque capacity several times as large as the one hour rating, and the shorter the time which requires a large torque, the more becomes possible to make the motor/generator 2 small in size and light in weight. Thus, when the driving time of the motor/generator 2 is equal to or smaller than 3 seconds as in the first embodiment mentioned above, it is possible to make the motor/generator 2 small in size and light in weight.

Furthermore, in the first embodiment, the sum of the output torque of the engine 1 and the output torque of the motor/generator 2 is supplied to the input side of the transmission device 4, however, assuming that the gear ratio (sun gear tooth number/ring gear tooth member) of the planetary gear mechanism which is the differential device is $\alpha$ when the torque of the ring gear R is made to be 1.0, the torque of the sun gear S will be $\alpha$, and the torque of the pinion carrier CR will be 1.0+$\alpha$. Thus, the torque of the motor/generator 2 can be exerted up to $\alpha$ times as large as the torque of the engine 1. For example, assuming that $\alpha$=0.65, the torque 1.65 times as large as the engine torque acts on the input shaft of the transmission device 4, and it is possible to exhibit the same degree of performance as a torque converter.

Furthermore, in the first embodiment, when the direct coupling clutch 36 as changed over from the non-coupled condition to the coupled condition, the torque reducing control as performed to gradually reduce the driving torque of the motor/generator 2. Accordingly, it is possible to surely prevent the occurrence of the shock due to the rapid torque reduction, and at the same time, since the driving torque of the motor/generator 2 is added to the driving torque of the engine 1 during such a period to contribute to the acceleration of the vehicle, the accelerating performance of the vehicle can be improved.

Next, a second embodiment of the present invention will be described with reference to FIGS. 8 and 9.

In the second embodiment, during the stopping of the vehicle, the motor/generator is operated in a power generation mode, and the generated electric power is used to drive an auxiliary machine or the like of the vehicle and to charge the storage battery 6.

Figure 8:
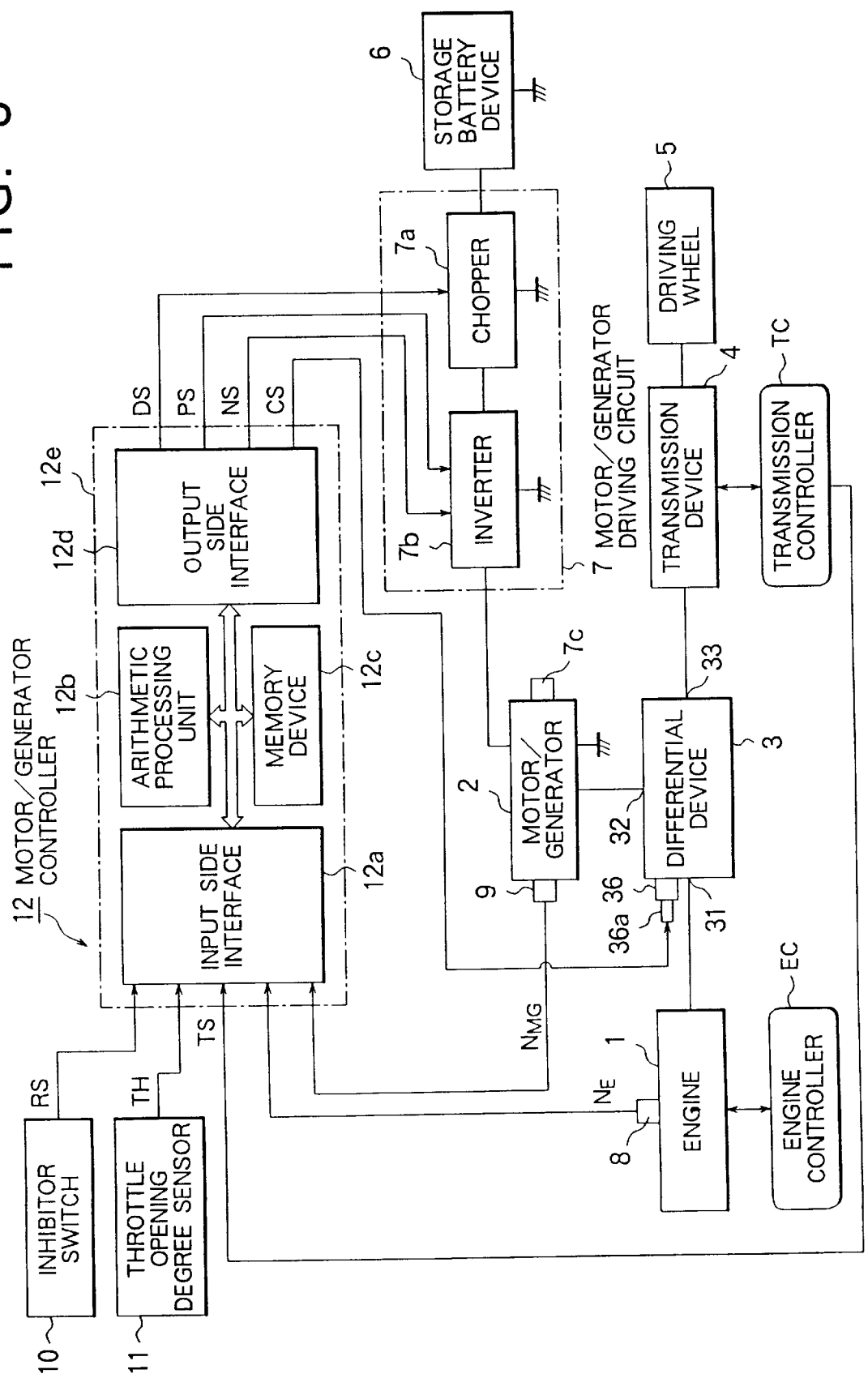
FIG. 8 is a schematic block diagram showing a second embodiment of the invention.

Specifically, as shown in FIG. 8, when the inverter 7b of the motor/generator driving circuit 7 is supplied with a forward rotation control signal PS from the motor/generator controller 12, the inverter 7b delivers a three-phase AC to the motor/generator 2 to drive the motor/generator 2 as a motor during forward rotation, and during reverse rotation, the motor/generator 2 is operated as a generator to generate a counter motive force, and the generated counter motive force is used for regeneration to charge the storage battery 6. Whereas when a reverse rotation control signal NS is supplied from the motor/generator controller 12, the motor/generator 2 is operated as the generator during forward rotation to generate the counter motive force, and at the same time, the generated counter motive force is used for regeneration to charge the storage battery 6.

Figure 9:
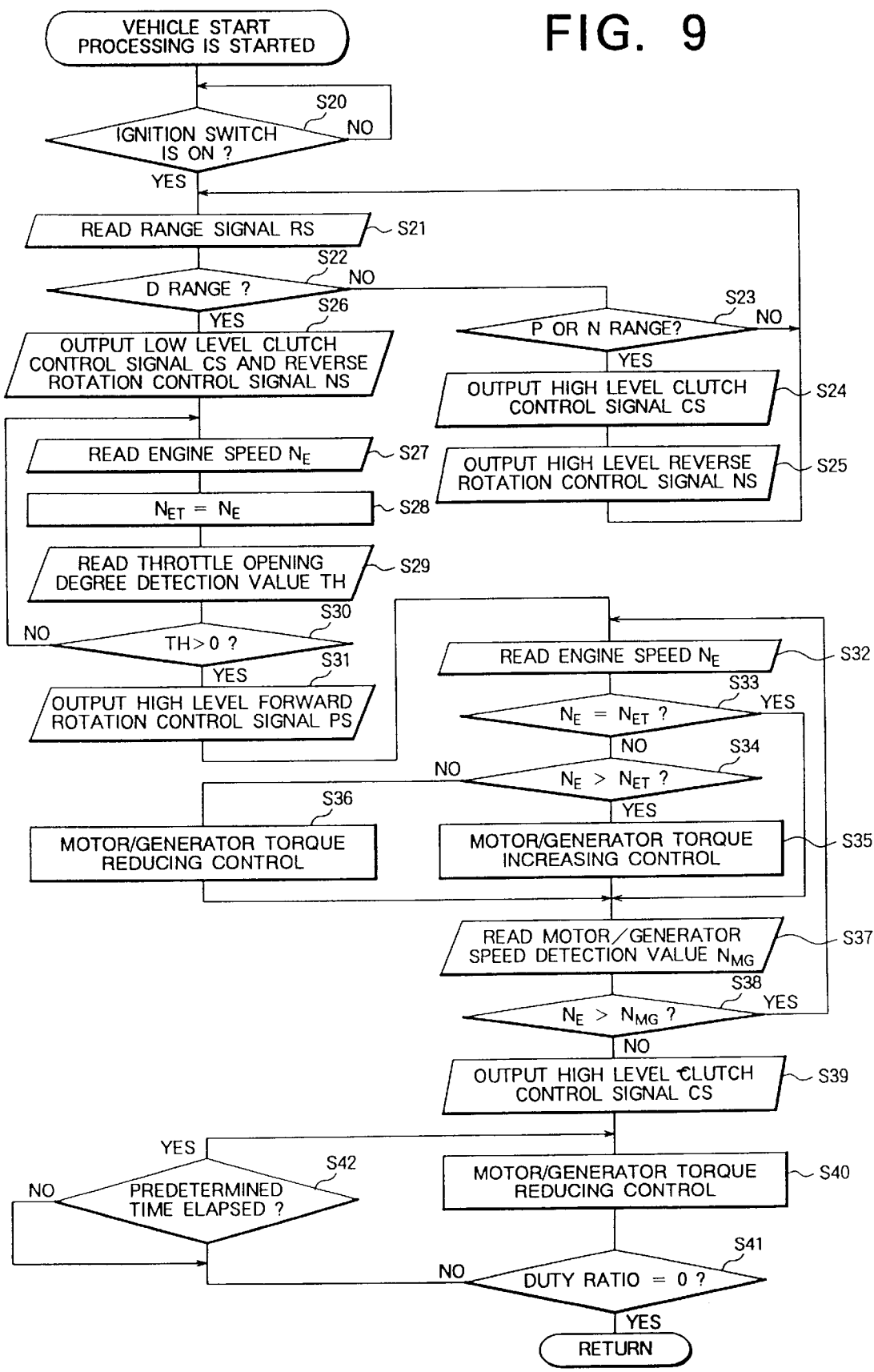
FIG. 9 is a flow chart of an example of a vehicle start control processing of a motor/generator controller in the second embodiment of the invention.

On the other hand, a vehicle start control processing by the motor/generator controller 12 is formed as shown in FIG. 9.

Specifically, first in step S20, it is decided whether or not an ignition switch (not shown) is in an on condition, and if it is in an off condition, it is waited until the ignition switch is turned on. If it is in the on condition, proceeds to step S21.

In this step S21, a range signal RS of the inhibitor switch 10 is read, and then proceeds to step S22, and it is decided whether or not the range signal RS is in a drive range D. If it is in the drive range D, proceeds to step S26 as it is, and if it is in a parking range P and neutral range N or the like other than the drive range D, proceeds to step S23 and it is decided whether or not the range signal RS is in the parking range P or in the neutral range N. If it is not in the parking range P or in the neutral range N, returns to step S21, and if it is in the parking range P or in the neutral range N, proceeds to step S24. In step S24, a clutch control signal CS at a high level is delivered to the electromagnetic solenoid 36a of the direct coupling clutch 36, and then proceeds to step S25. After delivering a reverse rotation control signal NS at a high level to the inverter 7b of the motor/generator driving circuit 7, returns to the above-mentioned step S21.

In step S26, a clutch control signal CS at a low level is delivered to the electromagnetic solenoid 36a of the direct coupling clutch 36, and also a reverse rotation control signal NS at a low level to the inverter 7b, and then proceeds to step S27.

In steps S27 to S30, a processing similar to that in steps S3 to S6 in FIG. 3 is performed, and if the result of decision in step S30 shows that TH>0, proceeds to step S31. In this step S31, after delivering a forward rotation control signal PS at a high level to the inverter 7b, proceeds to steps S32 to S42.

In these steps S32 to S42, a similar processing to that in steps S7 to S17 is carried out.

In the second embodiment, the vehicle start control processing of FIG. 9 is started by turning on the key switch while the vehicle is stopping with the engine 1 stopped.

In this condition, since the ignition switch is turned off, the engine 1 is not started, and it is in a waiting condition in step S20. When the engine 1 is started by turning on the ignition switch under the condition wherein a parking range P or a neutral range N is selected by the selecting lever, it proceeds to step S21 from step S20. In step S21, a range signal RS of the inhibitor switch 10 is read, and since the parking range P or the neutral range N has been selected, proceeds to step S24 from step S22 through step S23. In step S24, a clutch control signal CS at a high level is delivered to the electromagnetic solenoid 35a of the direct coupling clutch 36.

Figure 10:
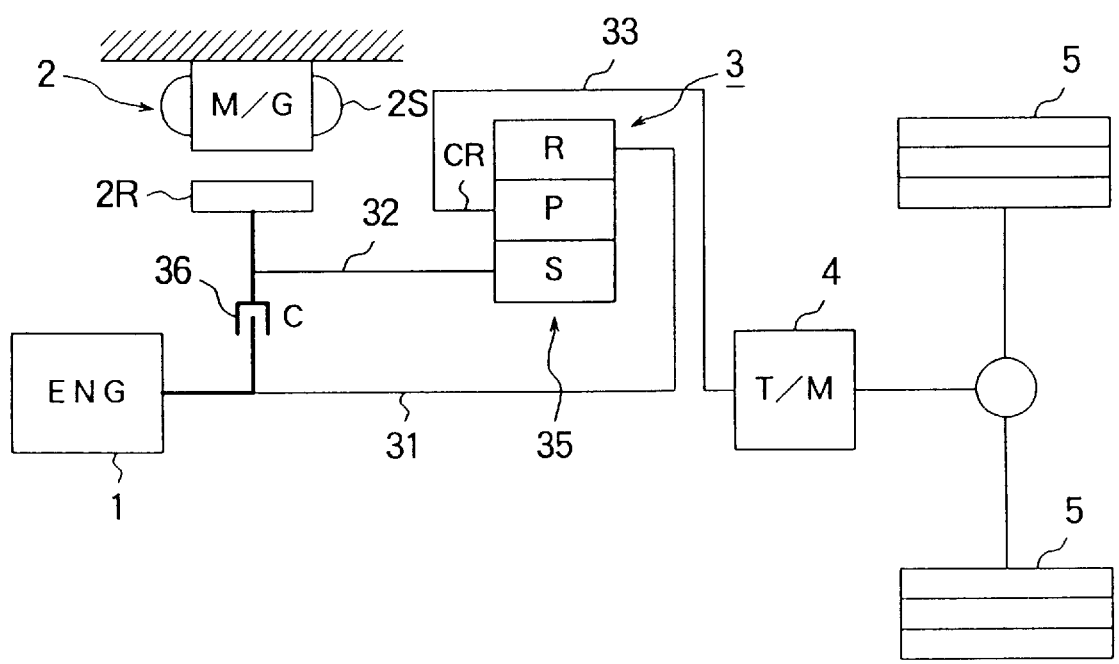
FIG. 10 is an explanation diagram showing a parking or neutral range power generation mode in the second embodiment of the invention.
Figure 11:
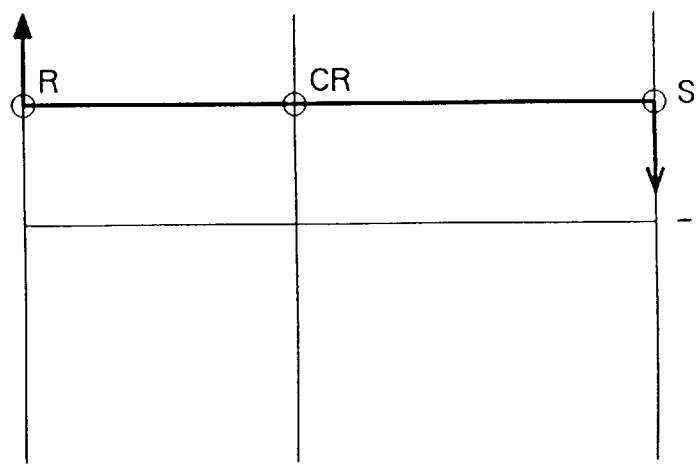
FIG. 11 is a lever diagram relating to FIG. 10.

Consequently, since the direct coupling clutch 36 enters the coupled condition, as shown in FIG. 10, the output of the engine 1 is directly transmitted to the driving shaft of the motor/generator 2 through direct coupling clutch 36, and the rotor of the motor/generator 2 is driven into forward rotation, and a lever diagram at this time is shown as in FIG. 11.

Subsequently, proceeds to step S25, and since a reverse rotation control signal NS at a high level is delivered to the inverter 7b of the motor/generator driving circuit 7, the inverter 7b is driven and controlled so that the thyristors or the inverter 7b generates a three-phase AC having an opposite phase to that at the time of forward rotation driving. As a result, the motor/generator 2 is operated as a generator, and an induced electromotive force generated by the motor/generator 2 is supplied to the storage battery device 6 through the inverter 7b and chopper 7a, and the storage battery device 6 is charged.

Figure 12:
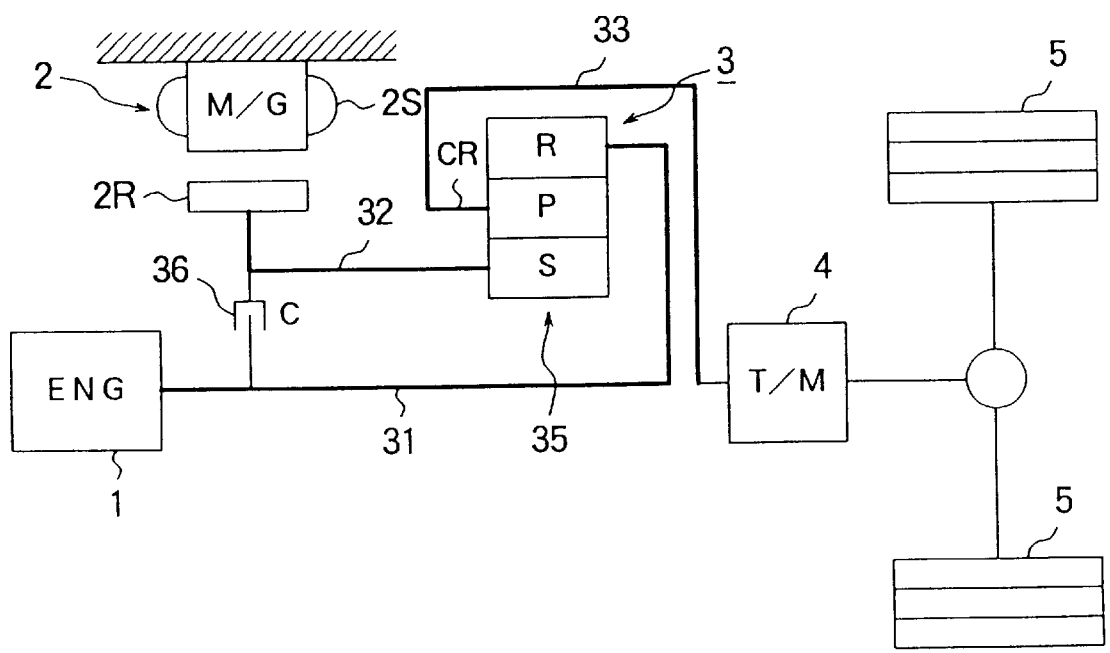
FIG. 12 is an explanation diagram showing a drive range idling power generation mode in the second embodiment of the invention.
Figure 13:
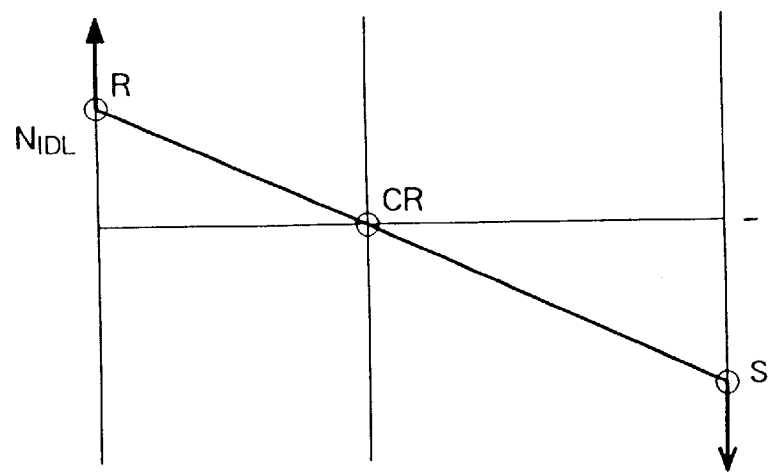
FIG. 13 is a lever diagram relating to FIG. 12.

Thereafter, in order to start the vehicle, when the drive range D is selected by the selecting lever, in the vehicle start control processing of FIG. 9, proceeds to step S26 from step S22, and a clutch control signal CS at a low level is delivered to the electromagnetic solenoid 36a of the direct coupling clutch 36. As a result, the direct coupling clutch 36 is changed over from the coupled condition to the non-coupled condition, and as shown in FIG. 12, the coupled condition between the engine 1 and the motor/generator 2 is released, and at the same time, since the transmission device 4 is controlled to a transmission ratio of the first speed, the rotary driving force of the engine 1 which is controlled at the idling speed $N_{IDL}$ is transmitted to the rotor of the motor/generator 2 through the ring gear R, pinion P and sun gear S. Thus, as shown in a lever diagram in FIG. 13, the ring gear R is rotated at the idling speed $N_{IDL}$, and since the pinion carriage CR is stopping, the sun gear S is driven into reverse rotation, and the rotor of the motor/generator 2 connected thereto is driven into reverse rotation to enter a vehicle start waiting condition.

In this vehicle start waiting condition, in step S26, since a forward rotation control signal PS at a high level is delivered to the inverter 7b, the condition wherein the motor/generator 2 is operated as the generator is maintained, and the charging of the storage battery 6 by the induced electromotive force generated by the motor/generator 2 is continued, and the motor/generator 2 enters a drive range idling power generation mode.

Subsequently, when the throttle opening degree detection value TH becomes larger than "0" by depressing the accel pedal, in FIG. 9, proceeds to step S31 from step S30, and since a forward rotation control signal PS at a high level is delivered to the inverter 7b, the motor/generator 2 enters a reverse rotation power generating condition. Thereafter, when performing the processing from step S32 onwards, similar to the first embodiment described above, the duty ratio of the braking duty control signal BS is feedback controlled so that the engine speed detection value $N_E$ coincides with the engine target speed $N_{ET}$.

Then, when the speed detection value $N_{MG}$ of the motor/generator 2 reaches the engine speed detection value $N_E$, a clutch control signal CS at a high level is delivered to the electromagnetic solenoid 36a of the direct coupling clutch 36, and the direct coupling clutch 36 enters the coupled condition so that the vehicle enters a driving condition solely by the engine 1.

According to the second embodiment, when the vehicle is stopping and the engine 1 is in the vicinity of the idling speed $N_{IDL}$ and the parking range P or the neutral range N has been selected, the power generation is performed by the motor/generator 2 by utilizing the rotary driving force of the engine 1. By virtue of this, it becomes possible to charge the storage battery device 6 and to drive other equipment and auxiliary machines, and to omit an alternator required in the prior art vehicle thereby to reduce the weight.

Moreover, even in the condition where the drive range D is selected by the selecting lever, and in the condition where the accel pedal is not depressed, likewise it is possible to perform the power generation by the motor/generator 2 by utilizing the rotary driving force of the engine 1.

Also, in a drive range idling power generation mode shown in FIG. 12 where the drive range D is selected by the selecting lever and the accel pedal is not depressed, by increasing a power generation load which is generated by the motor/generator 2, the torque of the input shaft of the transmission device 4 is increased, and it is possible to generate a creep force similar to that in the conventional torque converter.

Figure 14:
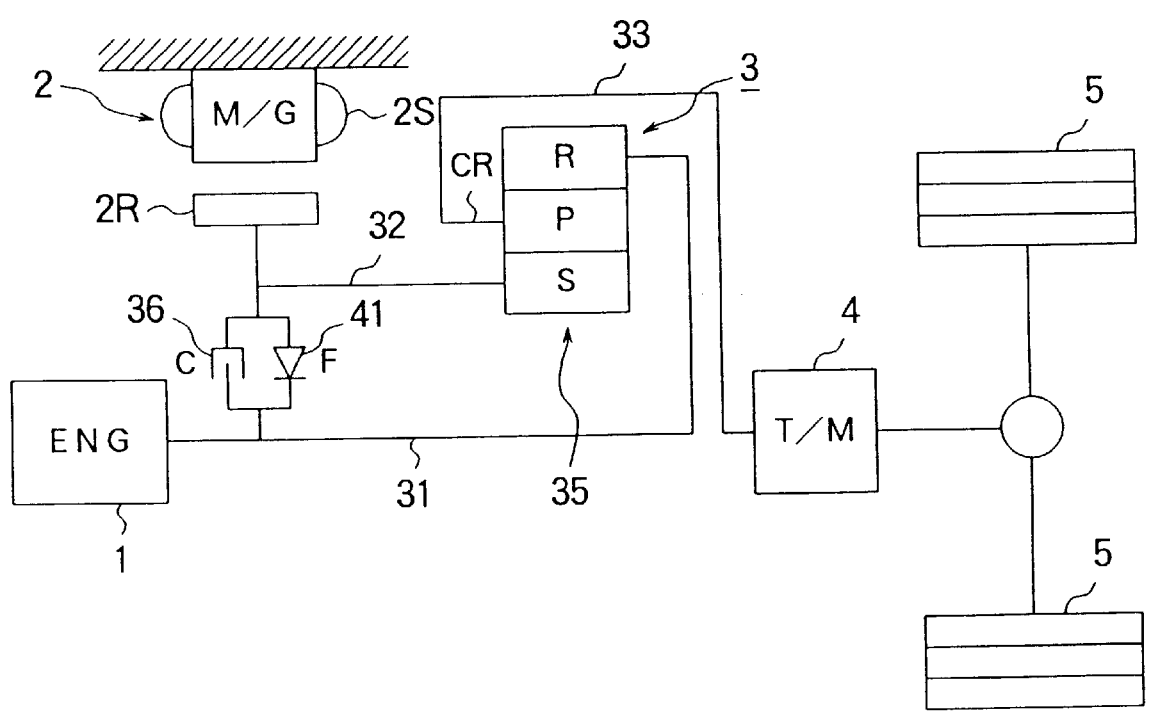
FIG. 14 is a schematic diagram of a differential device showing a variant in the first and second embodiments of the invention.

In the above-mentioned first and second embodiments, it is described as to the case where the coupling condition of the direct coupling clutch 36 is controlled by the vehicle start control processing of FIGS. 3 and 9. However, the present invention is not limited to this, and the coupling shock may be prevented by interposing a one-way clutch 41 in parallel to the direct coupling clutch 36 as shown in FIG. 14 in which the one-way clutch 41 enters a coupled condition when the direction of rotation of the motor/generator 2 is the same as the direction of rotation of the engine 1 and when the motor/generator speed is equal to or higher than the engine speed, so that the one-way clutch 41 mechanically enters the coupled condition to achieve a complete synchronous coupling when the speed detection value $N_{MG}$ of the motor/generator 2 exceeds the engine speed $N_E$ at the time of starting the vehicle.

In this case, since the engine 1 and the motor/generator 2 are mechanically and surely coupled by the one-way clutch 41 when the speed detection value $N_{MG}$ of the motor/generator 2 exceeds the engine speed detection value $N_E$, it is possible to surely suppress even a minor coupling shock due to a response delay or the like of the motor/generator controller 12. Accordingly, in the vehicle start control processing in FIG. 3 or 9, in the processing in step S13 or step S38, it becomes possible to control the direct coupling clutch 36 to enter the coupled condition by proceeding to step S14 or step S39 after confirming that the rotational speed of the sun gear S is surely equal to the rotational speed of the ring gear R. Thus, the occurrence of the coupling chock can be surely prevented.

Next, a third embodiment of the present invention will be described with reference to FIGS. 15 and 16.

In this third embodiment, it is intended to perform regenerative braking by operating the motor/generator 2 as a generator when the vehicle enters a decelerating condition.

Figure 15:
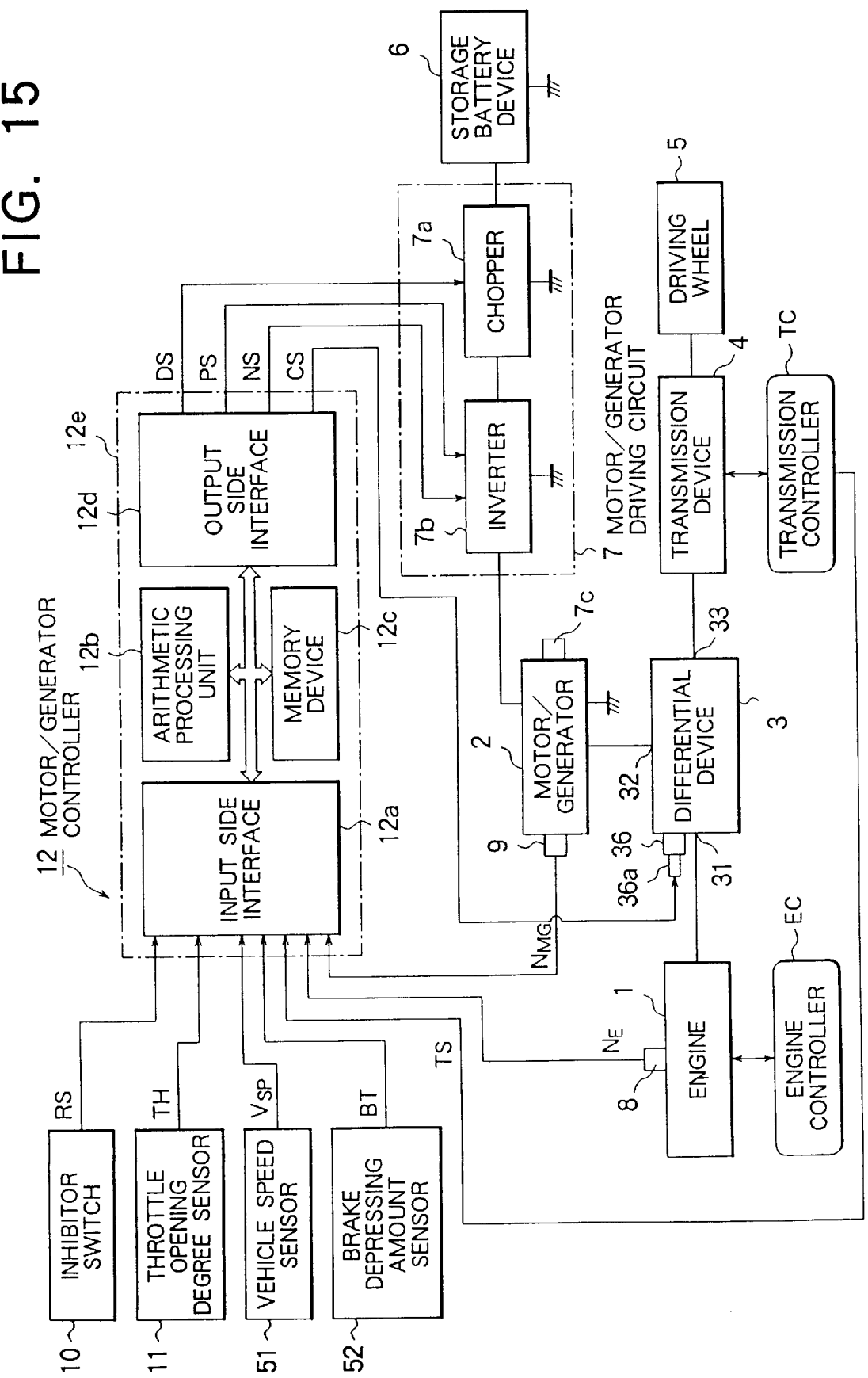
FIG. 15 is a schematic block diagram showing a third embodiment of the invention.

Specifically, as shown in FIG. 15, an engine speed detection value $N_E$, a motor/generator speed detection value $N_{MG}$, a range signal RS, and a throttle opening degree detection value TH are applied to the input side interface circuit 12a of the motor/generator controller 12, and in addition, there are applied with a vehicle speed detection value $V_{SP}$ of a vehicle speed sensor 51 for detecting a vehicle speed, a brake depressing amount signal BT of a brake depressing amount sensor 52 for detecting a depressing amount of a brake pedal, and a transmission ratio signal TS representing a transmission ratio from a transmission device controller TC for controlling the transmission device 4.

Figure 16:
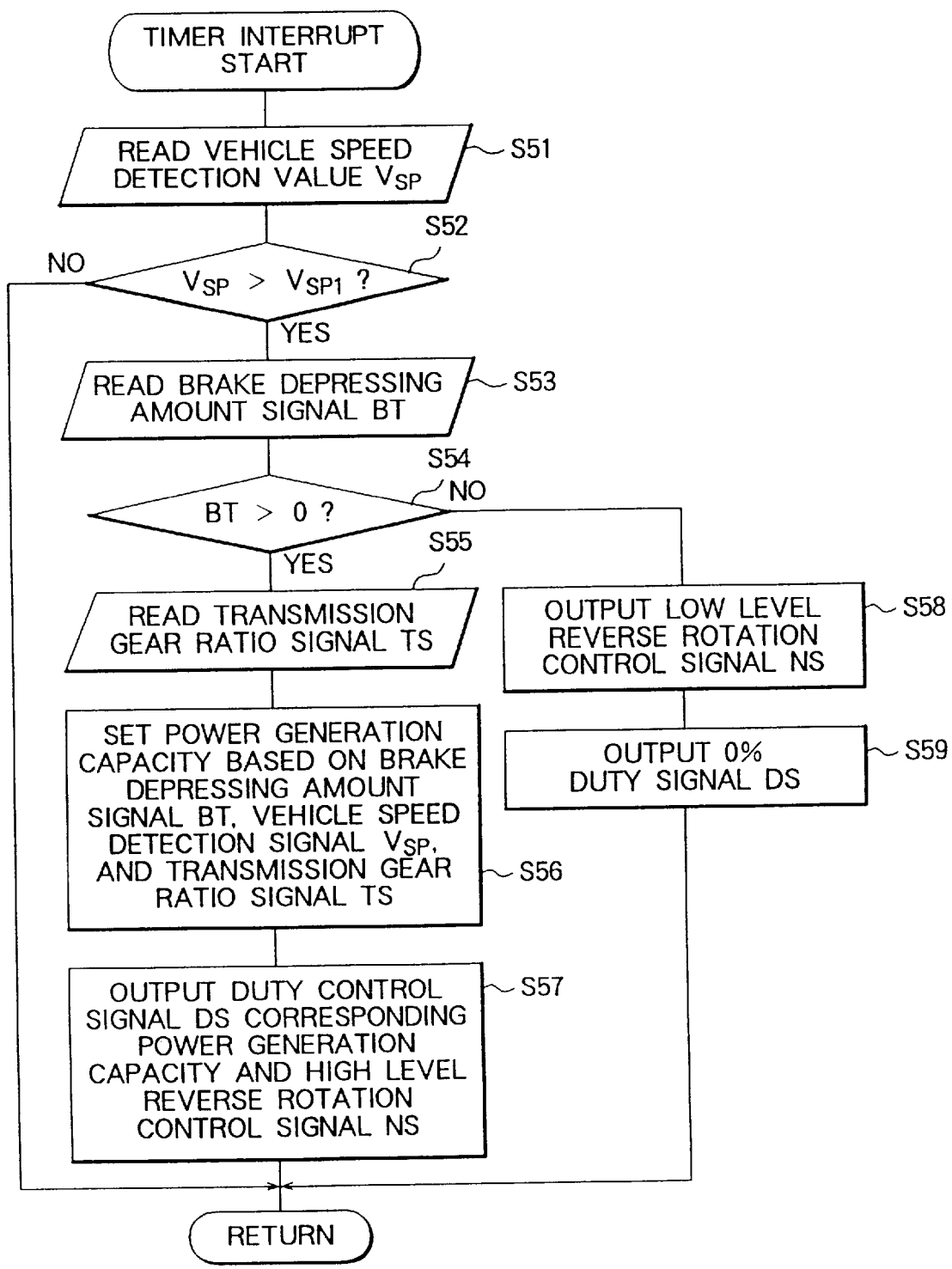
FIG. 16 is a flow chart of an example of a regenerative braking processing in the third embodiment of the invention.

In the arithmetic processing unit 12b of the motor/generator controller 12, a regenerative braking processing shown in FIG. 16 is executed in addition to the vehicle start control processing of FIG. 9.

This decelerating power generation processing is executed as a timer interrupt processing at each predetermined time, and first, in step S51, the vehicle speed detection value VSP of the vehicle speed sensor 51 is read, and then proceeds to step S52, it is decided whether or not the vehicle is running with the vehicle speed detection value $V_{SP}$ exceeding a predetermined value $V_{SP1}$. It the vehicle speed detection value $V_{SP}$ is equal to or lower than the predetermined value $V_{SP1}$, it is judged that the vehicle is stopping or the vehicle is in a low speed running with a speed near the stopping, and the timer interrupt processing is finished as it is and returns to a predetermined main program. If the vehicle speed detection value $V_{SP}$ is exceeding the predetermined value $V_{SP1}$, it is judged that the vehicle is running, and proceeds to step S53, In step S53, the brake depressing amount signal BT of the brake depressing amount sensor 52 is read, and then proceeds to step S54, and it is decided whether or not the brake depressing amount signal BT is larger than "0". It BT>0, it is judged that the regenerative braking is required, and proceeds to step S55.

In this step S55, a transmission ratio signal TS from the transmission device controller TC is read, and then proceeds to step S56. In step S56, a power generation capability of the motor/generator 2 is set on the basis of the brake depressing amount signal BT, vehicle speed detection signal $V_{SP}$, and transmission ratio signal TS.

Then proceeds to step S57, and a duty control signal DS corresponding to the set power generation capability is delivered to the chopper 7a, and at the same time, a reverse rotation control signal NS at a high level is delivered to the inverter 7b, and then the timer interrupt processing is finished and returns to a predetermined main program.

On the other hand, when the decision result indicates that BT=0, proceeds to step S58, and a a reverse rotation control signal NS at a low level is delivered to the inverter 7b, and then proceeds to step S59. In step S59, a duty control signal DS of 0% is delivered to the chopper 7a, and then the timer interrupt processing is finished and returns to a predetermined main program.

Figure 17:
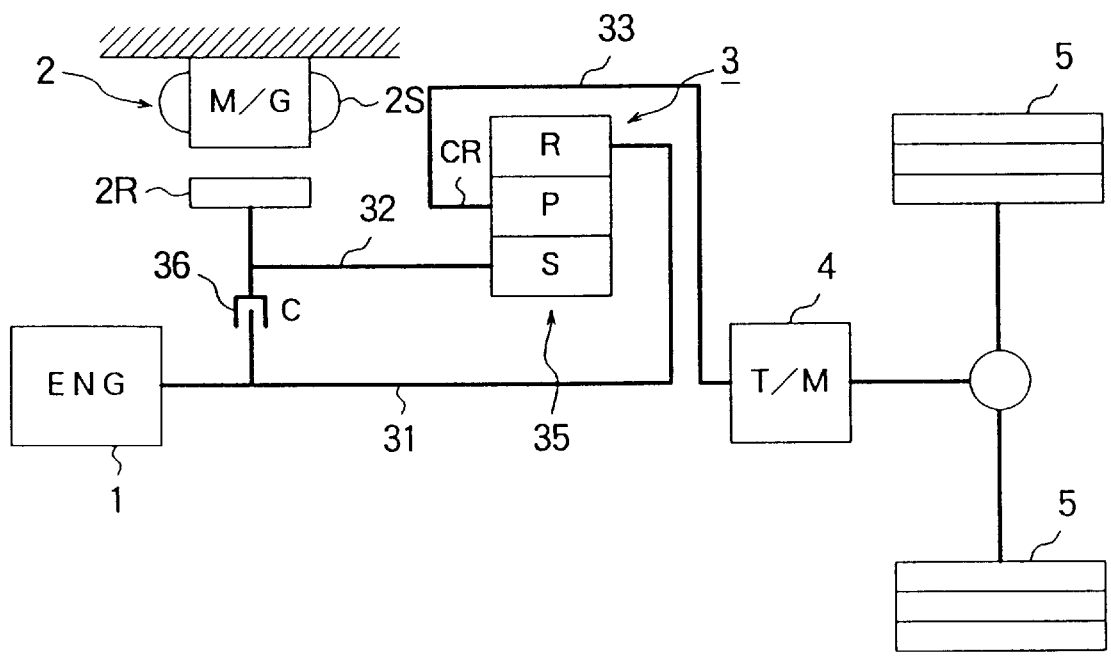
FIG. 17 is an explanation diagram showing a regeneration mode in the third embodiment of the invention.

According to this third embodiment, when the vehicle is stopping and at the time of starting the vehicle by depressing the accel pedal, the vehicle start control processing of FIG. 9 is executed, and a similar operation to the second embodiment is performed. After starting the vehicle while maintaining the engine target speed $N_{ET}$, when the engine speed detection value $N_E$ and the motor/generator speed detection value $N_{MG}$ are coincident with each other, as shown in FIG. 17, the direct coupling clutch 36 is controlled to enter a coupled condition.

When the vehicle speed detection value $V_{SP}$ exceeds the predetermined value $V_{SP1}$ while maintaining the coupled condition of the direct coupling clutch 36, proceeds to step S53 from step S52. At this time, when the vehicle continues its accelerating condition with the accel pedal being depressed, in steps S58 and S59, the chopper 7a and the inverter 7b of the motor/generator driving circuit 7 are brought into a non-operating condition so that the motor/generator 2 is changed over into an idling condition. Then the timer interrupt processing is finished.

From this accelerating condition, when the depression of the accel pedal is released, and the brake pedal is depressed instead to enter a braking condition, in the processing in FIG. 16, proceeds to step S55 from step S54, and a transmission ratio signal TS is read from the transmission controller TC. Then proceeds to step S56, and a power generation capability of the motor/generator 2 is set on the basis of a brake depressing amount signal BT, a vehicle speed detection value $V_{SP}$, and a transmission ratio signal TS. Then proceeds to step S57, and a duty control signal DS corresponding to the power generation capability is delivered to the chopper 7a, and at the same time, a reverse rotation control signal NS is delivered to the inverter 7b.

Figure 18:
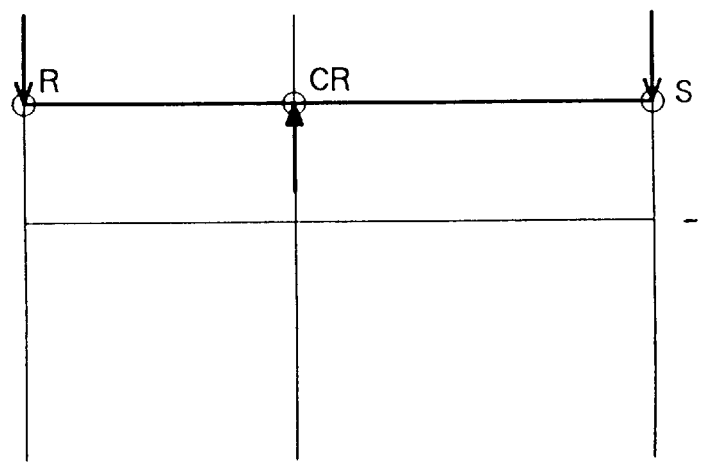
FIG. 18 is a lever diagram relating to FIG. 17.

At this time, since the engine 1 and the motor/generator 2 are coupled by the direct coupling clutch 36 as shown in a lever diagram of FIG. 18, the ring gear R, pinion carriage CR, and sun gear S are driven into forward rotation at the same speed. Thus, since the motor/generator 2 is in a forward rotation condition, an induced electromotive force generated by the motor/generator 2 is supplied to the storage battery device 6 to charge the same.

From this braking condition, when the depression of the brake pedal is released and enters a non-braking condition, in the processing in FIG. 16, proceeds to steps S58 and S59 from step S54, and a reverse rotation control signal NS at a low level is delivered to the inverter 7b, and at the same time, a duty control signal DS of 0% is delivered to the chopper 7a. Consequently, the motor/generator 2 is changed over into an idling condition.

According to this third embodiment, in addition to the advantage obtained in the first and second embodiments, since the motor/generator 2 enters a regenerative braking condition when the vehicle is brought into a braking condition during the vehicle is running, decelerating energy can be regenerated, and the fuel consumption during running of the vehicle can be reduced.

In the above-mentioned third embodiment, it is described as to the case where the depression amount of the brake pedal is detected by the brake depression amount sensor 52, however, the present invention is not limited to this, and the regeneration of decelerating energy at the time of braking including engine brake may be achieved by detecting an engine brake condition by detecting a master cylinder pressure, or by detecting a coast down condition.

Next, a fourth embodiment of the present invention will be described with reference to FIGS. 19 and 20.

In this fourth embodiment, during running of the vehicle under a non-braking condition, in the case of requiring a large driving torque, that is, a high engine load for acceleration or the like, the motor/generator 2 is driven so that its driving torque is added to the engine.

Figure 19:
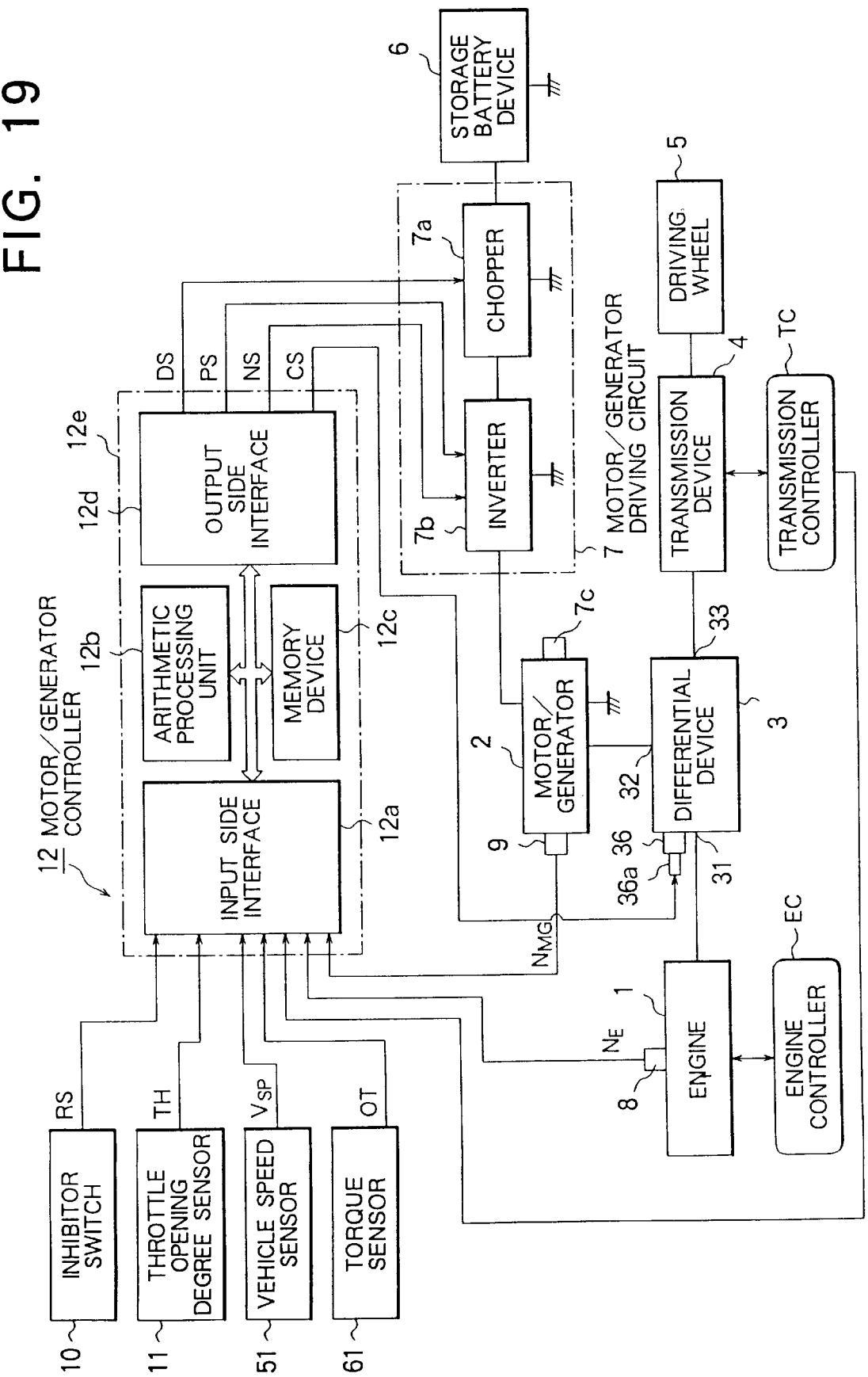
FIG. 19 is a schematic block diagram showing a fourth embodiment of the invention.

In this fourth embodiment, as shown in FIG. 19, an engine speed detection value NE, a motor/generator speed detection value $N_{MG}$, a range signal RS, and a throttle opening degree detection value TH are applied to the input side interface circuit 12a of the motor/generator controller 12, and in addition, there are further applied with a vehicle speed detection value $V_{SP}$ of a vehicle speed sensor 51 for detecting vehicle speed, and an output torque detection value OT of, for example, a magnetostriction type torque sensor 61 provided on an output shaft of the transmission device 4. In the arithmetic processing unit 12b of the motor/generator controller 12, similar to the first and second embodiments, the vehicle start control processing or FIG. 3 or FIG. 9 is executed when the vehicle is stopping and at the time of starting with the accel pedal depressed. Thus, a similar operation to the second embodiment is performed, and after starting the vehicle while maintaining the engine target speed $N_{ET}$, when the engine speed detection value NE and the motor/generator speed detection value $N_{MG}$ coincide with each other, the direct clutch 36 is controlled to enter a coupled condition, and also a torque assist control processing shown in FIG. 20 is executed as a timer interrupt processing at each predetermined time (for example, 10 msec).

In this torque assist control processing, first in step S61, a vehicle speed detection value $V_{SP}$ is read, and then proceeds to step S62, and it is decided whether or not the vehicle speed detection value $V_{SP}$ exceeds a predetermined value $V_{SP1}$. If $V_{SP}<V_{SP1}$, the timer interrupt processing is finished as it is, and returns to a predetermined main program, and it $V_{SP}>V_{SP1}$, proceeds to step S63. In step S63, an output torque detection value OT of the torque sensor 61 is read, and then proceeds to step S64, and it is decided whether or not the output torque detection value OT is equal to or larger than a predetermined set value $OT_S$.

This decision is to judge whether or not the assisting torque of the motor/generator 2 is needed, and it $OT>OT_S$, it is judged that the assisting torque is needed, and proceeds to step S65. In step S65, a driving torque corresponding to the output torque detection value OT is set, and then proceeds to step S66. A duty control signal DS of a duty ratio corresponding to the set driving torque as delivered to the chopper 7a, and then proceeds to step S67. In step S 67, a forward rotation control signal PS at a high level is delivered to the inverter 7b and then the timer interrupt processing is finished, and then returns to a predetermined main program.

On the other hand, if the decision result in step S64 represents that OT<$OT_S$, it is judged that assisting torque by the motor/generator 2 is not needed, and proceeds to step S68, and a duty control signal DS of 0% is delivered to the chopper 7a, and then proceeds to step S89. In step S89, a forward rotation control signal PS at a high level is delivered to the inverter 7b, and then finishes the timer interrupt processing and returns to a predetermined main program.

Figure 20:
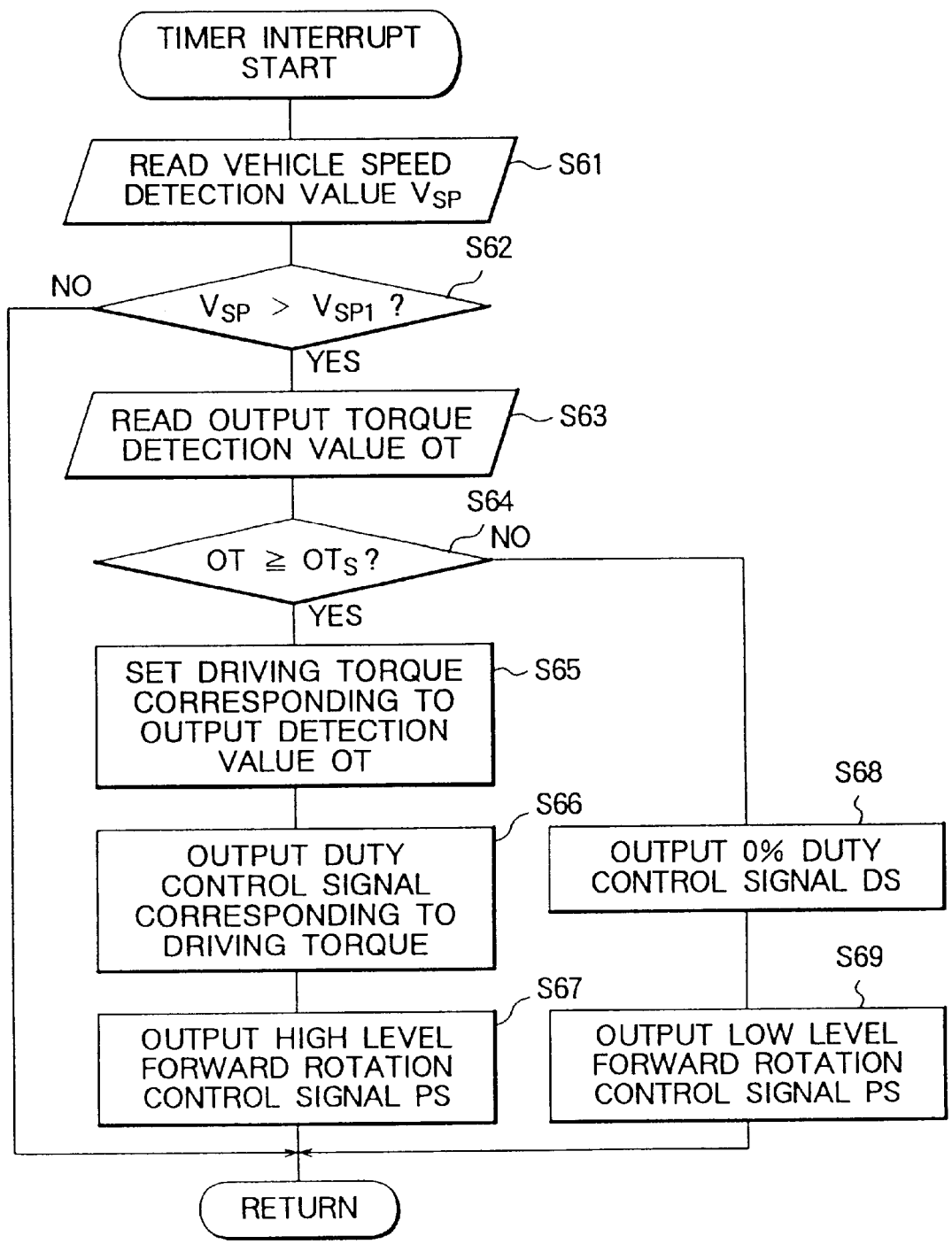
FIG. 20 is a flow chart of an example of a torque assist control processing in the forth embodiment of the invention.

This processing in FIG. 20 corresponds to driving control means.

Figure 21:
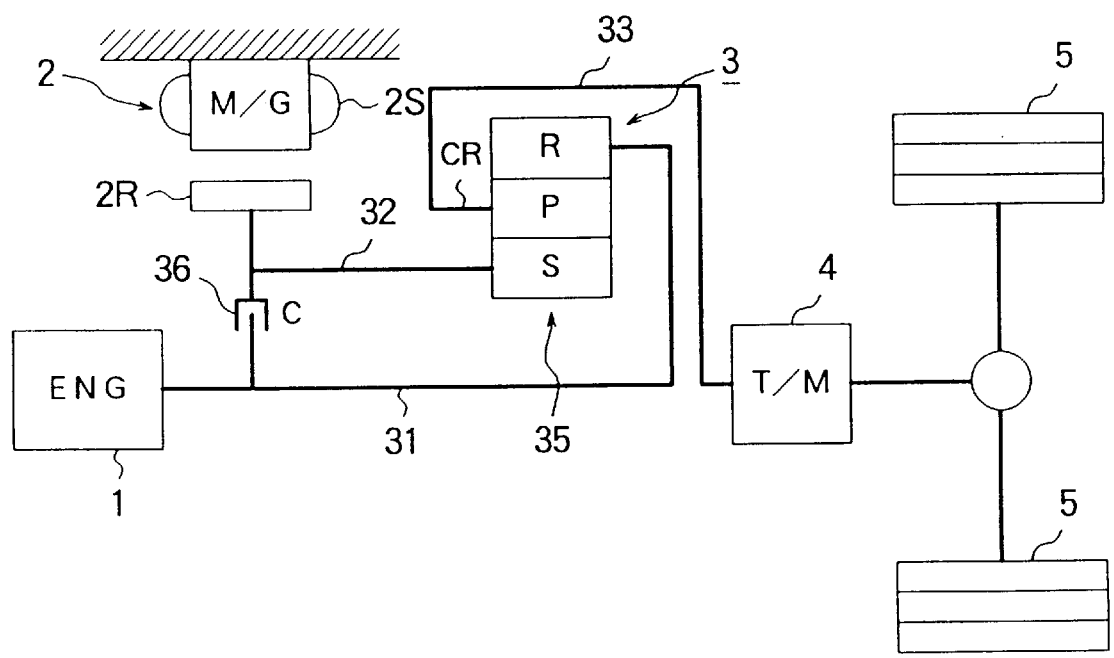
FIG. 21 is an explanation diagram showing a torque assist mode in the fourth embodiment of the invention.

According to this fourth embodiment, when the vehicle is stopping and at the time of starting the vehicle with the accel pedal being depressed, the vehicle start control processing of FIG. 3 or 9 is performed, and after starting the vehicle while maintaining the engine target speed $N_{ET}$, when the engine speed detection value $N_E$ coincides with the motor/generator speed detection value $N_{MG}$, the direct coupling clutch 36 is controlled to enter the coupled condition as shown in FIG. 21.

When the vehicle detection value $V_{SP}$ exceeds a predetermined value $V_{SP1}$ while maintaining the coupled condition of the direct coupling clutch 36, in the processing of FIG. 20, proceeds to step 63 from step S62. At this time, when the vehicle is running on a flat ground in a constant vehicle speed condition or in a gradual accelerating condition, since the output torque detection value OT of the output shaft of the transmission device 4 is less than a predetermined value $OT_S$, it is judged that the assisting torque by the motor/generator 2 is not needed, and proceeds to steps S68 and S69, and the chopper 7a and the inverter 7b are made to enter a non-operating condition and to continue an idling condition of the motor/generator 2.

From this assisting torque no-need condition, when the vehicle enters a rapid accelerating condition in order to outrun another vehicle or enters an ascent running condition, the output torque detection value OT of the transmission device 4 becomes a large value equal to or larger than the predetermined value $OT_S$, and proceeds to step S65 from step S64 in FIG. 20. In step S65, a driving torque corresponding to the output torque detection value OT is set, and then proceeds to step S66, and a duty control signal DS of a duty ratio corresponding to the set driving torque is delivered to the chopper 7a, and then proceeds to step S67, and a reverse rotation control signal NS at a high level is delivered to the inverter 7b.

Figure 22:
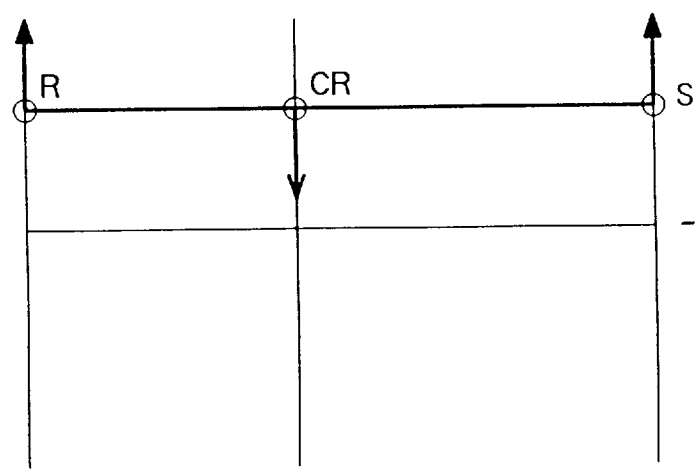
FIG. 22 is a lever diagram relating to FIG. 21.

At this time, at the differential device 3, as shown in FIG. 21 and its lever diagram FIG. 22, since the engine 1 and the motor/generator 2 are coupled by the direct coupling clutch 36, the ring gear R, pinion carriage CR, and sun gear S are driven into forward rotation at the same speed. Since the motor/generator 2 is in a forward rotation condition, the driving torque generated by the motor/generator 2 is added to the driving torque generated by the engine 1, and this added torque is transmitted to the transmission device 4 through the pinion carriage CR, and thus, the rapid acceleration an the ascent running is achieved easily, and it is possible to improve the accelerating performance and to improve the fuel consumption by effectively utilizing the regeneration energy.

Next, a fifth embodiment will be described with reference to FIG. 23.

In this fifth embodiment, the start of the engine 1 is performed by the motor/generator 2, and similar to FIG. 14 described above, a one-way clutch 41 is connected in parallel with the direct coupling clutch 36 so that the one-way clutch 41 enters a coupled condition when the direction of rotation of the motor/generator 2 is the same as the direction of rotation of the engine 1 and the rotational speed of the motor/generator 2 is equal to or larger than that of the engine 1. In the condition where the parking range P or neutral range N is selected by the selecting lever, at the time of starting the engine 1, when the chopper 7a and the inverter 7b are controlled to enter an operating condition by the motor/generator controller 12, the motor/generator 2 is driven into forward rotation with a predetermined torque capable of starting the engine 1. The forward rotation driving torque generated by the motor/generator 2 is transmitted to the engine through the one-way clutch 41, and consequently the engine 1 is driven into rotation. Under this condition, by igniting an ignition plug (not shown), the engine 1 is started.

Figure 23:
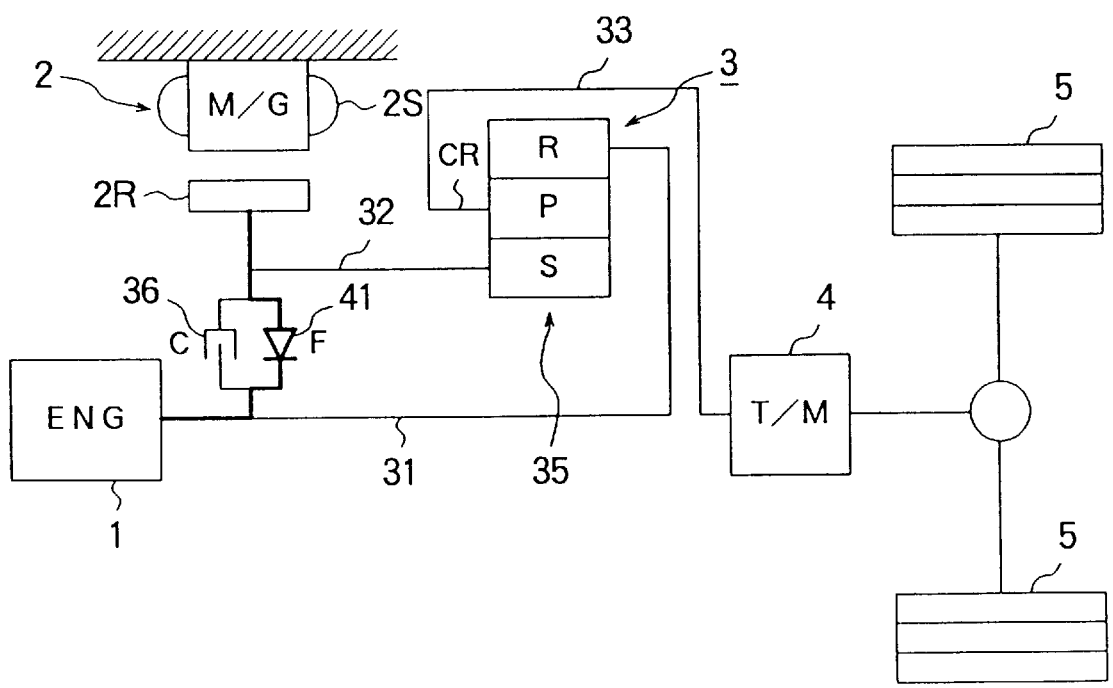
FIG. 23 is an explanation diagram showing an engine start mode in the fifth embodiment of the invention.
Figure 24:
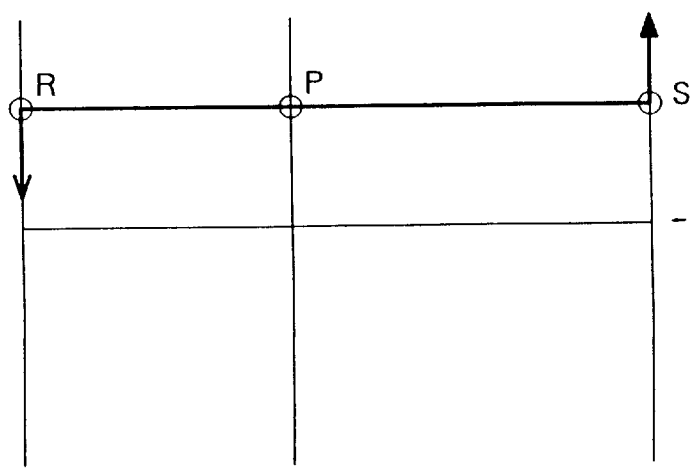
FIG. 24 is a lever diagram relating to FIG. 23.

At this time, as shown in FIG. 23 and in a lever diagram of the differential device 3 shown in FIG. 24, since the ring gear R and the sun gear S are directly coupled by the one-way clutch 41, the sun gear S is forward-rotated by the forward-rotation driving of the motor/generator 2, and the ring gear R connected to the engine 1 is also forward-rotated, and the pinion carriage CR is also forward-rotated. However, since the transmission device 4 is controlled to enter the parking range P or neutral range N, the output torque is never delivered from the transmission device 4.

According to the fifth embodiment, the engine 1 can be started by driving the motor/generator 2 into forward rotation, and it is possible to omit the starter motor and the electric hydraulic pump which have been required in the prior art vehicle to start the engine.

Figure 25:
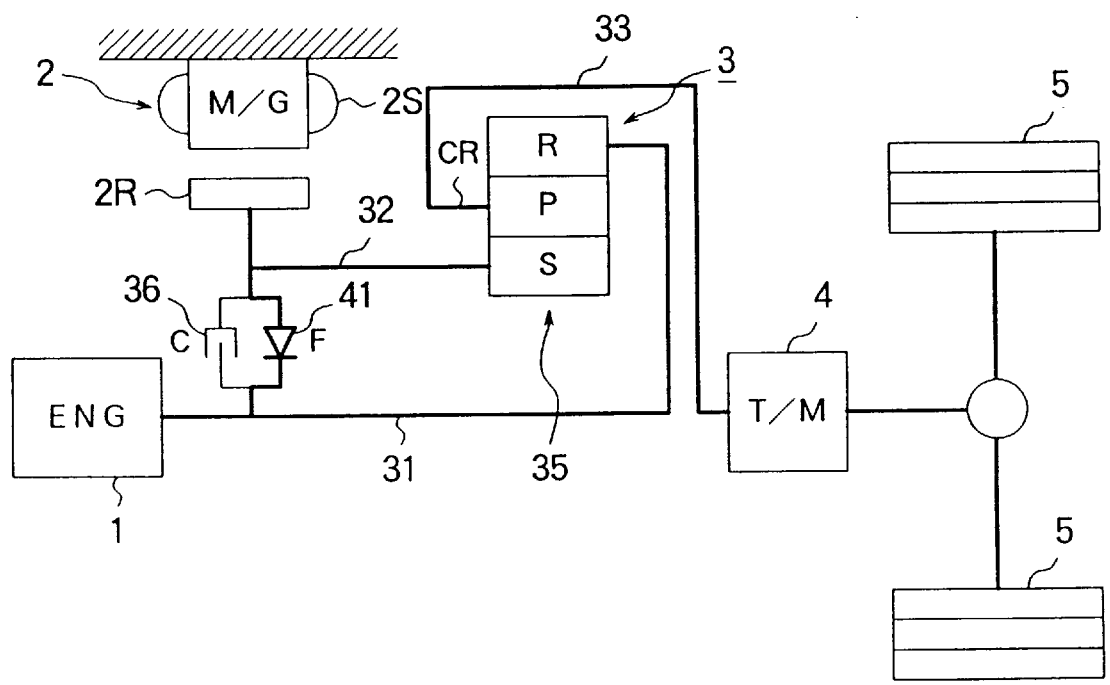
FIG. 25 is an explanation diagram showing a vehicle start mode while starting the engine in the fifth embodiment of the invention.
Figure 26:
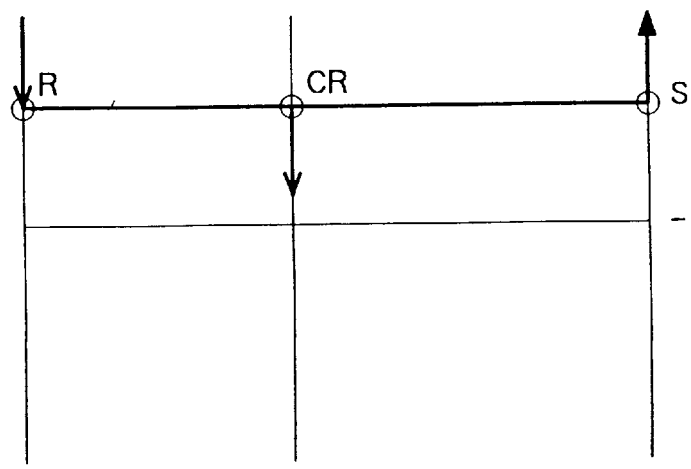
FIG. 26 is a lever diagram relating to FIG. 25.

In the fifth embodiment, while it is described as to the case where the motor/generator 2 is driven into forward rotation only for the purpose of starting the engine 1, however, the present invention is not limited to this. For example, when the engine 1 is idling, and under this condition it the engine stall occurs when a drive range D is selected by the selecting lever, it is also possible to start the vehicle, as shown in FIG. 25, by driving the motor/generator 2 into forward rotation, and starting the engine 1 through the one-way clutch 41, and at the same time, by transmitting the driving torque of the motor/generator 2 to the transmission device 4 through the pinion carriage CR.

Next, a sixth embodiment will be described with reference to FIG. 27.

In this sixth embodiment, it is designed to enable to achieve a hill holder function which prevents the vehicle from moving backwardly at the time of starting on an ascent.

Figure 27:
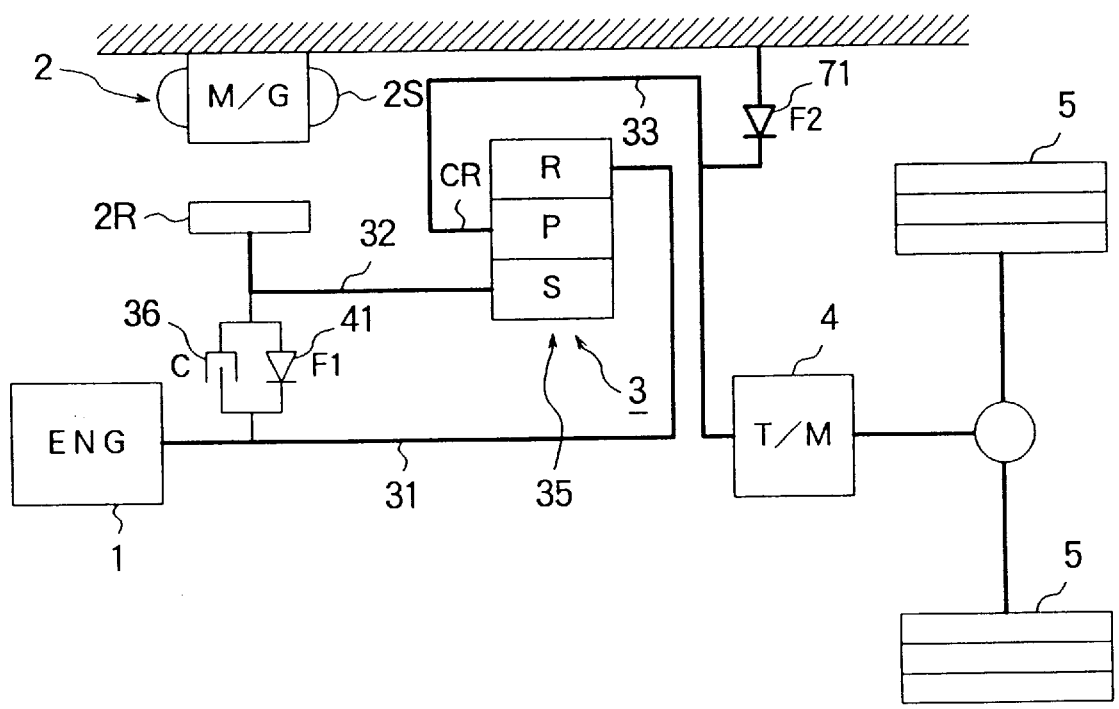
FIG. 27 is an explanation diagram at a time of hill holder operation showing a sixth embodiment of the invention.
Figure 28:
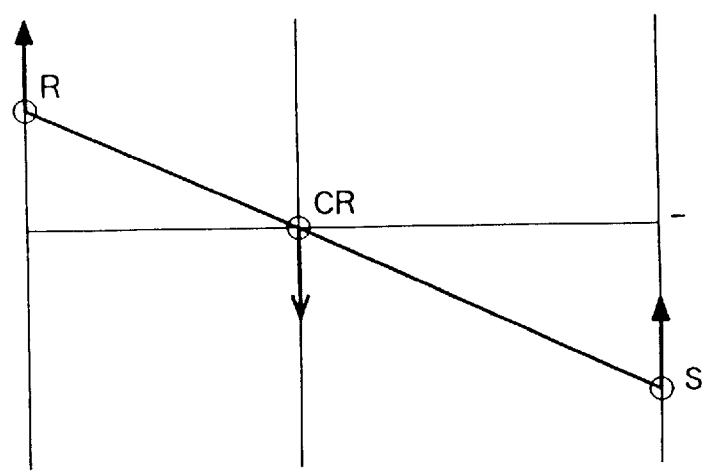
FIG. 28 is a lever diagram relating to FIG. 27.

In this sixth embodiment, as shown in FIG. 27, the structure is similar to that in FIG. 14 with the exception that a one-way clutch 71 which allows only a forward rotation of the pinion carriage CR is provided between a fixed portion and a power transmitting route between the pinion carriage CR and the input shaft of the transmission device 4.

According to the sixth embodiment, at the time of starting the vehicle on an ascent, as shown in FIG. 27, the engine 1 is driven into rotation, and at the same time, the motor/generator 2 is driven into forward rotation, and the sum of the driving torque of the engine 1 and the driving torque of the motor/generator 2 is transmitted to the transmission device 4 to start the vehicle on the ascent. At this time, it the driving torque for the start of the vehicle is insufficient, the input shaft of the transmission device 4, that is, the pinion carriage CR will be driven into reverse rotation due to the inertia of the vehicle, However, the drive of the pinion carriage CR into reverse rotation can be interrupted by the one-way clutch 71, and the backward movement of the vehicle on the ascent can be surely prevented by the exertion of the hill holder function.

Furthermore, in the sixth embodiment, since the reverse rotation of the pinion carriage CR is kept interrupted by the one-way clutch 71, by driving the motor/generator 2 into reverse rotation by controlling the motor/generator driving circuit 7 by the motor/generator controller 12, this rotary driving force is transmitted to the ring gear R with the direction of rotation reversed by the pinion P, it becomes possible to start the engine 1.

In each of the embodiments mentioned above, it is described as to the cases where the ring gear R of the differential device 3 is connected to the engine 1, the sun gear S is connected to the motor/generator 2, and the pinion carriage CR is connected to the transmission device 4 respectively, however, the present invention is not limited to these cases, but the sun gear S may be connected to the engine 1, and the pinion carriage CR may be connected to the transmission device 4, and furthermore, the sun gear S may be connected to the engine 1, the pinion carriage CR may be connected to the motor/generator 2, and the ring gear R may be connected to the transmission device 4 respectively.

Furthermore, in each of the embodiments mentioned above, it is described as to the case where the AC induction motor is utilized as the motor/generator 2, however, the present invention is not limited to this, but a DC motor/generator may be applied. In this case, it is only required that the motor/generator driving circuit 7 includes at least two switching elements which enable to control both the power running and the regenerative braking, and Furthermore, a brushless DC motor/generator may be applied.

While in each of the embodiments mentioned above, it is described as to the case where the direct clutch 36 constituting the coupling device is interposed between the first shaft 31 and the second shaft 32, however, the present invention is not limited to this, but the direct clutch 36 may be interposed between the first shaft 31 and the third shaft 33, or between the second shaft 32 and the third shaft 33 to obtain the same advantage as each of the embodiments mentioned above.

In this case, as shown in FIG. 14, when the one-way clutch 41 is provided in parallel with the direct coupling clutch 36, and when the direct coupling clutch 36 is interposed between the first shaft 31 and the third shaft 33, the one-way clutch 41 is connected to enter the coupled condition when the directions of rotation of both the shafts are coincident with each other and the rotational speed of the motor/generator 2 reaches equal to or higher than the engine speed so that the rotational speed of the third shaft 33 is equal to or higher than the rotational speed of the first shaft 31. Whereas, when the direct coupling clutch 36 is interposed between the second shaft 32 and the third shaft 33, the one-way clutch 41 is connected to enter the coupled condition when the directions of rotation of both the shafts are coincident with each other and the rotational speed of the motor/generator 2 reaches equal to or higher than the engine speed so that the rotational speed of the second shaft 32 is equal to or higher than the rotational speed of the third shaft 33.

The present invention offers the following advantages.

According to the first aspect of the invention, at the time of starting the vehicle, the coupling device is made to enter the non-coupled condition and the vehicle is started by controlling the torque of the electric rotary driving source so that the engine speed maintains the predetermined idling speed, and the coupling device is controlled to enter the coupled condition when the rotational speeds of the first to third shafts coincide with one another. Accordingly, it is possible to make small the rotational speed difference between the engine speed $N_E$ and the motor/generator speed $N_{MG}$, and to make the engine speed $N_E$ and the motor/generator speed $N_{MG}$ coincide with each other in a short time, and since the coupling device is changed over from the non-coupled condition to the coupled condition, when both the rotational speeds are in coincidence with each other, the occurrence of the coupling chock can be surely prevented, and the feeling of rapid change by the driver can be avoided. Furthermore, only a small driving time of the motor/generator is necessary regardless of the throttle opening degree and the gradient, and the motor/generator can be made small in size and light in weight.

Furthermore, according to the second aspect of the invention, there are provided with an engine speed detection means for detecting the engine speed, an electric rotary driving source speed detection means for detecting a rotational speed of the electric rotary driving source, an electric rotary driving source control means for controlling a torque of the electric rotary driving source, and a coupling control means for controlling a change-over of the coupling device between a non-coupled condition and a coupled condition. The electric rotary driving source control means sets an idling speed detected by the engine speed detection means at the time of starting of the vehicle to a target speed, and controls the torque of the electric rotary driving source so that the target speed is maintained, and the coupling control means controls the coupling device to enter the non-coupled condition when an engine speed detection value of the engine speed detection means is equal to or lower than a rotary driving source speed detection value of the electric rotary driving source speed detection value, and controls the coupling device to enter the coupled condition when the engine speed detection value exceeds the rotary driving source speed detection value. As a result, a similar advantage to the first aspect of the invention can be obtained.

According to the third aspect of the invention, the rotary driving source control means operates the electric driving source as a generator to reduce the speed and to apply a braking torque to the engine when the engine speed detection value of the engine speed detection means exceeds the target speed and when the electric rotary driving source is in a reverse rotating condition. Whereas when the engine speed detection value exceeds the target speed and when the electric rotary driving source is in a forward rotating condition, the electric rotary driving source is operated as the motor to increase the speed thereby to apply a braking torque to the engine. As a result, in addition to the advantages in the first and second aspect of the invention, another advantage is offered in that regardless of the direction of rotation of the electric rotary driving source, it is controlled to the optimum torque, and the engine speed can be controlled to the target speed.

Furthermore, according to the fourth aspect of the invention, during stopping of the vehicle, when the transmission device is being set to a non-driving range, the rotary driving source control means controls the electric rotary driving source to enter a forward generating condition, and during the stopping of the vehicle, when the transmission device is in a driving range and the engine is at an idling speed, the electric rotary driving source is controlled to enter a reverse generating condition. Thus, it is possible to eliminate the alternator which has been used conventionally, and this enables to reduce the size and weight of the vehicle.

Furthermore, according to the fifth aspect of the invention, rotary driving source control means controls the electric rotary driving source to increase the power generating capability as the vehicle speed at the time of braking is increased thereby to increase a regeneration braking force. Thus, it is possible to effectively perform regeneration of energy at the time of deceleration, and to improve the fuel consumption during running of the vehicle, Furthermore, according to the sixth aspect of the invention, the transmission device is constituted solely by a transmission mechanism which includes no starting mechanism for performing torque control at the time of starting. Thus, the structure of the transmission device can be made simple, and the vehicle can be made small in size and light in weight.

Furthermore, according to the seventh aspect of the invention, an one-way clutch is connected in parallel with the coupling device which enters a coupled condition when the directions or rotation of the two shafts which are to be connected and disconnected are in coincident with each other and when the speed of the electric rotary driving source is equal to or higher than the engine speed. Thus, it is possible to simplify the synchronous coupling control of the coupling device which couples at the time when the engine speed coincides with the electric rotary driving source, and good coupling control without transmission shock can be achieved.

Furthermore, according to the eighth aspect of the invention, at the time of starting the engine, the engine is started by the electric rotary driving source through the one-way clutch. Thus, it is possible to eliminate the heretofor used alternator, and the vehicle can be made small in size and light in weight.

Furthermore, according to the ninth aspect of the invention, driving control means is provided for driving and controlling both the engine and the electric rotary driving source on the basis of an accel opening degree and a vehicle speed when a high engine load is needed after the coupling device enters the coupled condition at the time of starting the vehicle. Thus, it is possible to effectively utilize the regenerated energy, and the fuel consumption during running of the vehicle can be improved.

Furthermore, according to the tenth aspect of the invention, the rotary driving source control means controls to gradually reduce the driving torque of the electric rotary driving source. Thus, it is possible to surely prevent the occurrence of the shock due to the rapid reduction of the driving torque, and to improve the accelerating performance.

I claim:

1. A control apparatus of a parallel hybrid electric vehicle comprising:

an engine;

an electric rotary driving source having both functions of a generator and a motor;

a transmission device;

a differential device having a first shaft connected to the engine, a second shaft connected to an output shaft of the electric rotary driving source, and a third shaft connected to the transmission device; and a coupling device for connecting and disconnecting between two shafts selected from the first to the third shafts, wherein the coupling device is made to enter a non-coupled condition at the time of start of the vehicle so that the torque of the electric rotary driving source is controlled to maintain the engine speed at a predetermined idling speed during the starting, and the coupling device is controlled to enter a coupled condition when rotational speeds of the first, second and third shafts of the differential device are synchronized with one another.

2. A control apparatus according to claim 1, wherein an one-way clutch is connected in parallel with the coupling device, and said one-way clutch enters a coupled condition when the directions of rotation of the two shafts which are to be connected and disconnected are in coincidence with each other and when the speed of the electric rotary driving source is equal to or higher than the engine speed.

3. A control apparatus according to claim 2, wherein, at the time of starting the engine, the engine is started by the electric rotary driving source through the one-way clutch.

4. A control apparatus according to claim 1, wherein driving control means is provided for driving and controlling both the engine and the electric rotary driving source on the basis of an accel opening degree and a vehicle speed when a high engine load is needed after the coupling device enters the coupled condition at the time of starting the vehicle.

5. A control apparatus of a parallel hybrid electric vehicle comprising:

an engine;

an electric rotary driving source having both functions of a generator and a motor;

a transmission device;

a differential device having a first shaft connected to the engine, a second shaft connected to an output shaft of the electrical rotary driving source, and a third shaft connected to the transmission device; and a coupling device for connecting and disconnecting between two shafts selected from the first to the third shafts;

an engine speed detection means for detecting an engine speed;

an electric rotary driving source speed detection means for detecting a rotational speed of the electric rotary driving source;

an electric rotary driving source control means for controlling a torque of the electric rotary driving source; and a coupling control means for controlling a change-over of the coupling device between the non-coupled condition and the coupled condition, wherein said electric rotary driving source control means sets an idling speed detected by the engine speed detection means at the time of starting of the vehicle to a target speed, and controls the torque of the electric rotary driving source so that the target speed is maintained, and said coupling control means controls the coupling device to enter the non-coupled condition when an engine speed detection value of the engine speed detection means exceeds a rotary driving source speed detection value of the electric rotary driving source speed detection means, and controls to enter the coupled condition when the engine speed detection value is equal to or lower than the rotary driving source speed detection value.

6. A control apparatus according to claim 5, said rotary driving source control means makes the electric driving source operate as a generator to reduce the speed and to apply a braking torque to the engine when the engine speed detection value of the engine speed detection means exceeds the target speed and when the electrical rotary driving source is in a reverse rotating condition, whereas when the engine speed detection means exceeds the target speed and when the electric rotary driving source is in a forward rotating condition, the electrical rotary driving source is operated as the motor to increase the speed thereby to apply a braking torque to the engine.

7. A control apparatus according to claim 5, wherein during stopping of the vehicle, when the transmission device is being set to a non-driving range, the rotary driving source control means controls the electric rotary driving source to enter a forward power generating condition, and during the stopping of the vehicle, when the transmission device is in a driving range and the engine is at an idling speed, the electric rotary driving source is controlled to enter a reverse power generating condition.

8. A control apparatus according to claim 5, wherein said rotary driving source control means controls the electric rotary driving source to increase the power generation capability as the vehicle speed at the time of braking is increased thereby to increase a regenerative braking force.

9. A control apparatus according to claim 5, wherein said rotary driving source control means controls to gradually reduce the driving torque of the electric rotary driving source when said coupling means enters the coupled condition and the driving of said electric rotary driving source is to be stopped.

* * * * *